United States Patent
Nakamura et al.

(10) Patent No.: US 6,646,435 B1
(45) Date of Patent: Nov. 11, 2003

(54) ANGULAR POSITION DETECTING APPARATUS FOR LINEARLY DETECTING ANGULAR POSITION IN A WIDER RANGE

(75) Inventors: Tsutomu Nakamura, Kariya (JP); Toshihisa Ishihara, Okazaki (JP); Takashi Hamaoka, Kariya (JP)

(73) Assignees: Nippon Soken, Inc., Aichi-Pref. (JP); Denso Corporation, Aichi-Pref. (JP)

( * ) Notice: Subject to any disclaimer, the term of this patent is extended or adjusted under 35 U.S.C. 154(b) by 177 days.

(21) Appl. No.: 09/614,251

(22) Filed: Jul. 12, 2000

(30) Foreign Application Priority Data

Jul. 16, 1999 (JP) ............................ 11-202474
Dec. 17, 1999 (JP) ............................ 11-358329

(51) Int. Cl.[7] .......................... G01B 7/30; G01R 33/025
(52) U.S. Cl. .......................... 324/207.25; 324/207.21; 324/207.12
(58) Field of Search ...................... 324/207.2, 207.21, 324/207.24, 207.25, 207.12, 235, 225, 251, 252

(56) References Cited

U.S. PATENT DOCUMENTS

| | | | |
|---|---|---|---|
| 3,365,594 A | * | 1/1968 | Davidson, Jr. ............... 324/251 |
| 4,392,375 A | | 7/1983 | Eguchi et al. |
| 4,893,502 A | | 1/1990 | Kubota et al. |
| 5,544,000 A | | 8/1996 | Suzuki et al. |
| 5,789,917 A | | 8/1998 | Oudet et al. |
| 6,137,288 A | * | 10/2000 | Luetzow .................. 324/207.2 |
| 6,166,655 A | * | 12/2000 | Chen et al. ............. 340/870.31 |
| 6,201,389 B1 | * | 3/2001 | Apel et al. ................ 324/207.2 |
| 6,222,359 B1 | * | 4/2001 | Duseler et al. .......... 324/207.2 |

FOREIGN PATENT DOCUMENTS

| | | |
|---|---|---|
| DE | 4400616 A2 | 7/1995 |
| JP | 61-75213 | 4/1986 |

* cited by examiner

*Primary Examiner*—Walter E. Snow
(74) *Attorney, Agent, or Firm*—Nixon & Vanderhye PC

(57) ABSTRACT

An angular position detecting apparatus using a magnetic detecting element, which can voluntary widely set an output change characteristic of the magnetic detecting element with respect to angular positions. An angular position detecting apparatus includes a cylindrical yoke, and a magnet fixed to a predetermined position in the cylindrical yoke. A magnetic detecting element, which is fixed to a rotor, is provided in a magnetic field generated between the magnet and the cylindrical yoke, so that a position of the magnetic detecting element is shifted from a rotation axis P of the rotor by a predetermined distance r. A ferromagnetic thin film magnetic resistance element applies a magnetic field which has intensity so that outputs from the elements are saturated. As a result, the magnetic detecting element generates outputs depending only on a magnetic flux detection angle $\theta s$ independent of an influence of changes of magnetic field intensity due to temperature changes. In this case, when at least one of a rotation radius r of the magnetic detecting element and a radius R of the cylindrical yoke is voluntary determined, an output change characteristic of the magnetic detecting element can be voluntary set.

17 Claims, 22 Drawing Sheets

ANGULAR POSITION DETECTING APPARATUS FOR LINEARLY DETECTING ANGULAR POSITION IN A WIDER RANGE

CROSS REFERENCE TO RELATED APPLICATION

This application is based upon Japanese Patent Application Nos. Hei. 11-202474 filed on Jul. 16, 1999 and Hei. 11-358329 filed on Dec. 17, 1999, the contents of which are incorporated herein by reference.

BACKGROUND OF THE INVENTION

1. Field of the Invention

This invention relates to angular position detecting apparatuses, and particular to an angular position detecting apparatus which detects an angular position of a target detection object by using a magnetic detecting element.

2. Related Art

In this kind of angular position detecting apparatus, an angular position detecting apparatus as shown in, for example, JP A 61-75213 (see FIG. 22), has been proposed. According to this angular position detecting apparatus, a cylindrical magnet 1 is magnetized so that a magnetic field is formed in parallel therein. A magnetic detecting element 2 is positioned at a center portion of the magnet 1. The magnet 1 (parallel magnetic field) is rotated in response to a rotation of the target detection object. As a result, the amount of magnetic flux crossing the magnetic detecting element 2 is changed. An output signal from the magnetic detecting element 2 changes in proportion to the amount of the magnetic flux. The angular position θm of the target detection object is detected based on an the output signal from the magnetic detecting element 2.

In the case where the angular position θm of the target detection object is detected based on the output signal from the magnetic detecting element 2 in this way, and the detectable range of the angular position θm is expanded, an output change characteristic of the magnetic detecting element 2 with respect to the angular position θm needs to be linearly changed to a wider range as much as possible.

However, according to the conventional structure, since the parallel magnetic field is rotated with respect to the magnetic detecting element 2, the amount of magnetic flux, crossing the magnetic detecting element 2 decreases in accordance with a trigonometric function. As a result, the output change characteristic of the magnetic detecting element 2 with respect to the angular position θm deviates from a line, and forms curves based on the trigonometric function (see FIG. BA). As a result, according to the conventional structure, a semi-linear output can be obtained within only a narrow range of the angular position θm. Therefore, the output change characteristic of the magnetic detecting element 2 with respect to the angular position θm becomes bad, and the detectable range of the angular position θm becomes narrow.

SUMMARY OF THE INVENTION

This invention has been conceived in view of the background thus far described and its object is to provide an angular position detecting apparatus which can optionally determine an output change characteristic of the magnetic detecting element with respect to the angular position within a wide range and which can improve a detection characteristic of the angular position.

According to a first aspect of the present invention, a magnetic field is generated between a magnet and a yoke, and a magnetic detecting element is provided in the magnetic field. Here, the magnetic detecting element is offset from a rotation axis of a rotor. In this case, a relationship between an angle of magnetic flux crossing the magnetic detecting element and angular position of the rotor is changed. By using this change, an output change characteristic of the magnetic detecting element with respect to the angular position can be widely set. As a result, a detection characteristic of the angular position can be improved.

According to a second aspect of the present invention, each of the magnetic detecting elements has a range of an angular position in which an output characteristic becomes linear. The range is different from each other with respect to every magnetic detecting element. An output selector selectively generates outputs of a particular magnetic detecting element in a linear region, depending on the angular position. As a result, a detectable angle range, in which an output change characteristic of the angular position detecting apparatus becomes linear, can be considerably expanded compared to a case where the magnetic detecting element is only one.

According to a third aspect of the present invention, a magnet and a magnetic detecting element are arranged so that outputs of the magnetic detecting element becomes substantially zero at around a particular angular position at which detection accuracy is extremely required. Incidentally, according to the angular position apparatus using the magnetic detecting element, detection accuracy is best at a point where the output of the magnetic detecting element becomes zero. This is because the point where the output of the magnetic detecting element becomes zero is the center of the linear region of the outputs, and therefore the linearity becomes the best. Furthermore, when the output of the magnetic detection is zero, influence to the magnetic detecting element due to a thermal characteristic becomes small. Therefore, influence to the magnetic detecting element due to a thermal characteristic becomes small at around a particular angular position at which detection accuracy is extremely required. As a result, a detection characteristic of the angular position can be improved.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

DESCRIPTION OF THE PREFERRED EMBODIMENTS

Hereinafter, a first embodiment of the present invention will be explained with reference to FIGS. 1 to 12. At first, a structure of an angular position detecting apparatus will be explained with reference to FIG. 1. A yoke 11 is made of a magnetic material such as a Permalloy or iron, and is formed in a cylindrical shape. At a predetermined position at the inner side of the cylindrical yoke 11, a magnet 12 such as a ferrite magnet is fixed. The magnet 12 is magnetized along a radial direction of the cylindrical yoke 11 such that an S-pole is arranged toward a center P of the cylindrical yoke 11, and an N-pole contacts with the cylindrical yoke 11. Here, positions of the S-pole and N-pole of the magnet 12 may be arranged opposite the position from that of FIG. 1. A thickness of the magnet 12 is set thinner than an internal diameter R of the cylindrical yoke 11. A sufficient space (not-shown) is secured between the magnet 12 and the center P of the cylindrical yoke 11. The magnet 12 and the cylindrical yoke 11 are fixed at a non-rotation portion (not-shown) of the housing or the like. The cylindrical yoke 11 is concentrically arranged with respect to a rotor (not-shown) that is connected to a target detection object.

Figure 1:
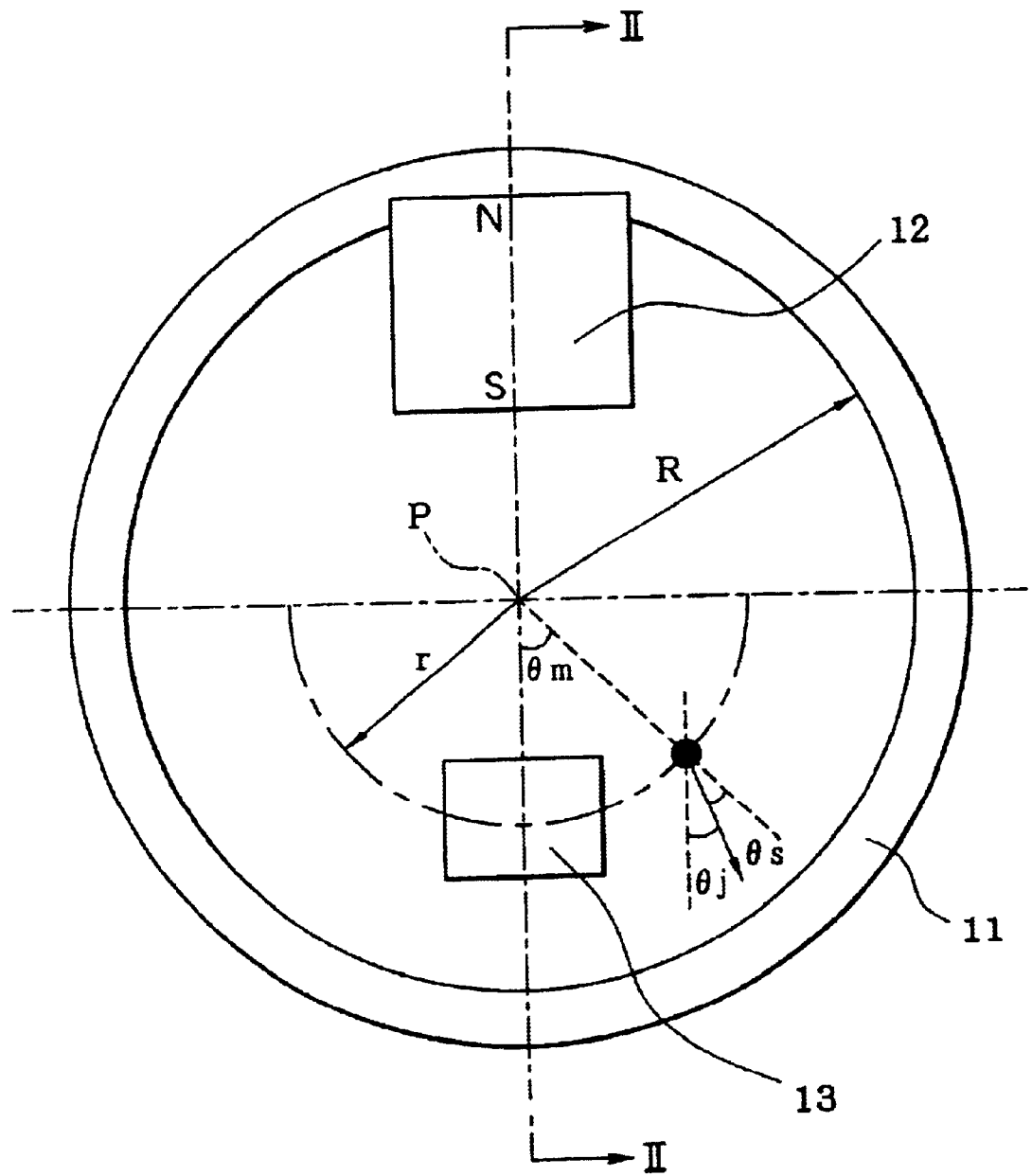
FIG. 1 is a plan view illustrating a main portion of an angular position detecting apparatus of a first embodiment according to the present invention.
Figure 2:
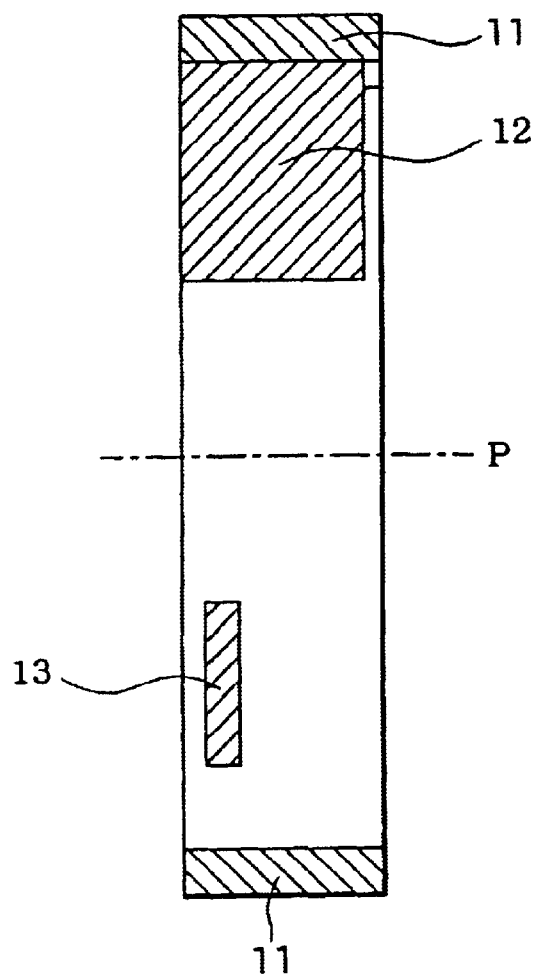
FIG. 2 is a vertical sectional view taken along a line II—II in FIG. 1.
Figure 3:
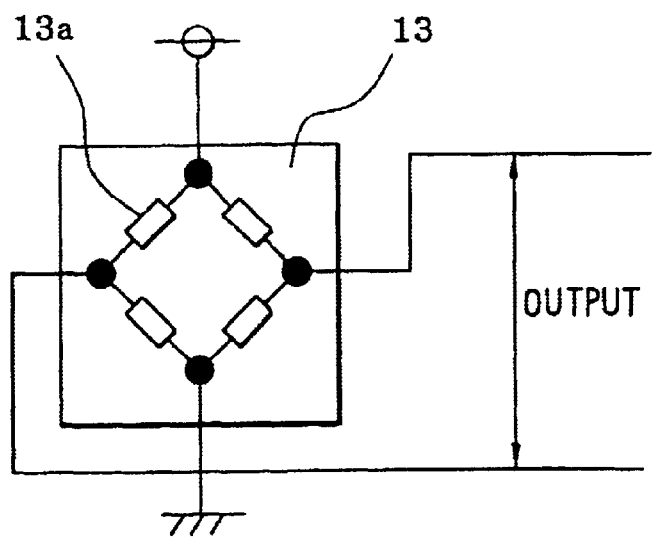
FIG. 3 is a circuit configuration of a magnetic detecting element.
Figure 4:
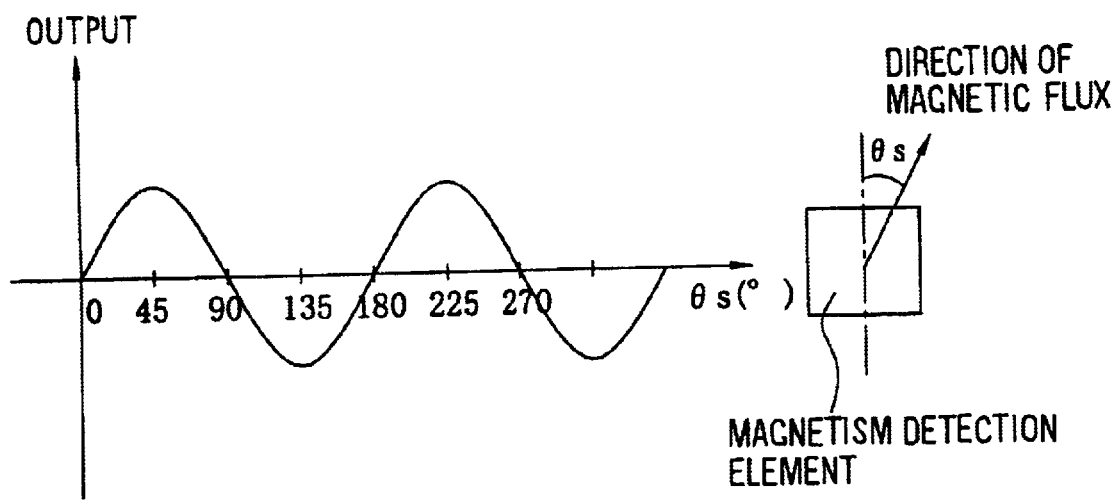
FIG. 4 is a diagram illustrating a relationship between an angle θs of magnetic flux crossing the magnetic detecting element and a magnetic flux detecting element.

A magnetic detecting element 13, which is fixed to the rotor, is arranged in the magnetic field that is generated between the magnet 12 and the cylindrical yoke 11. The position of the magnetic detecting element 13 is arranged at a distance of a predetermined distance r from a rotation axis P (a center of the cylindrical yoke 11). The magnetic detecting element 13 is constructed by a bridge circuit of ferromagnetic thin film magnetic resistance elements 13a, as shown in FIG. 3. A magnetic field, which has an intensity so that outputs from the elements 13 are saturated, is applied to the magnetic detecting element 13. As a result, the magnetic detecting element 13 generates outputs depending only on a magnetic flux detection angle θs independent of the intensity of the magnetic field, as shown in FIG. 4.

Here, the magnetic detecting element 13 is not limited to the ferromagnetic thin film magnetic resistance element, and may use a magnetic detecting element that generates outputs in proportion to magnetic field intensity from one direction, such as a Hall element or a semiconductor magnetic resistance element. These elements cannot directly detect the magnetic flux different from the ferromagnetic thin film magnetic resistance elements. Therefore, when this kind of element is used, two elements may be perpendicularly arranged with each other so as to calculate an angle of the magnetic flux based on a ratio of outputs from each element.

Figure 5:
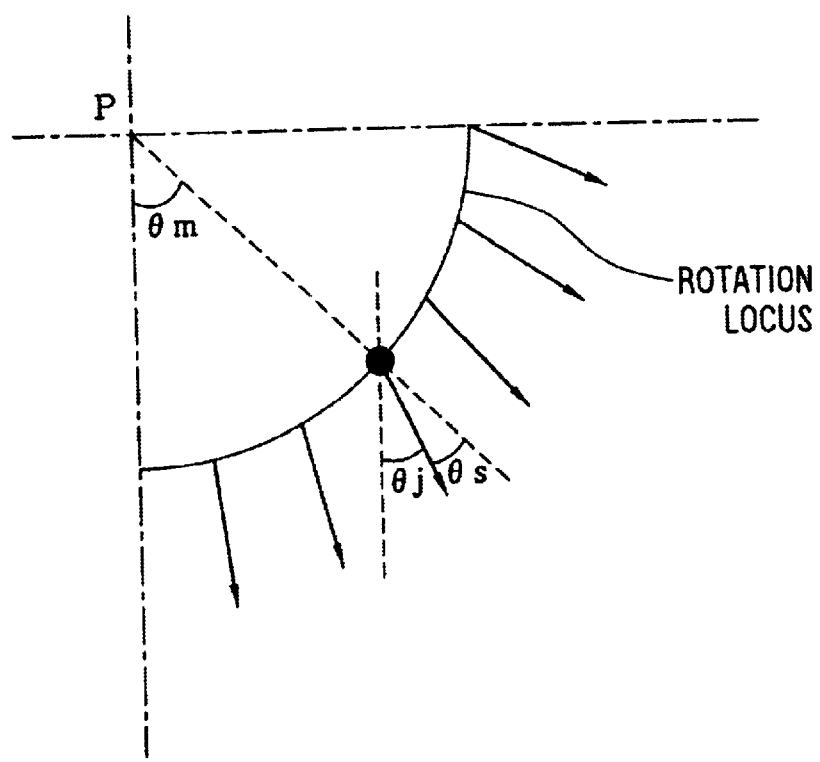
FIG. 5 is a diagram illustrating a relationship among a rotor angular position θm, a magnetic field angle θj, and a magnetic flux detection angle θs.
Figure 6:
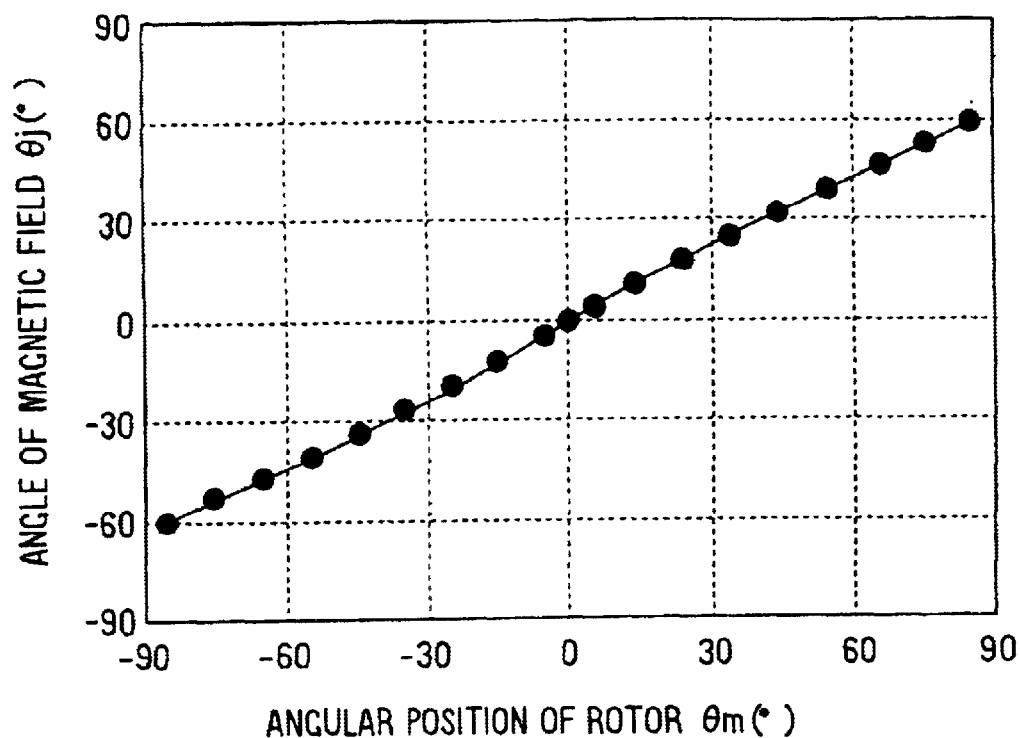
FIG. 6 is a diagram illustrating a change characteristic of the magnetic field angle θj with respect to the rotor angular position θm.

Next, a distribution of the magnetic flux that is generated between the magnet 12 and the cylindrical yoke 11 will be explained. The magnetic flux from one pole (S-pole) of the magnet 12 is spread toward the cylindrical yoke 11. The magnet 12 is arranged far from the rotation axis P of the rotor (center of the cylindrical yoke 11). Therefore, as shown in FIG. 5, a magnetic field angle $\theta j$ of a rotational locus (circumference whose center is the rotation axis P and whose diameter is r) of the magnetic detecting element 13 becomes smaller than the rotor angular position $\theta m$. FIG. 6 shows a diagram illustrating a relationship between the rotor angular position $\theta m$ and the magnetic field angle $\theta j$. Hereinafter, it is assumed that the rotor angular position $\theta m$ at a position on a line connecting a center of the magnet 12 with the rotation axis P is 0 degrees.

Figure 7:
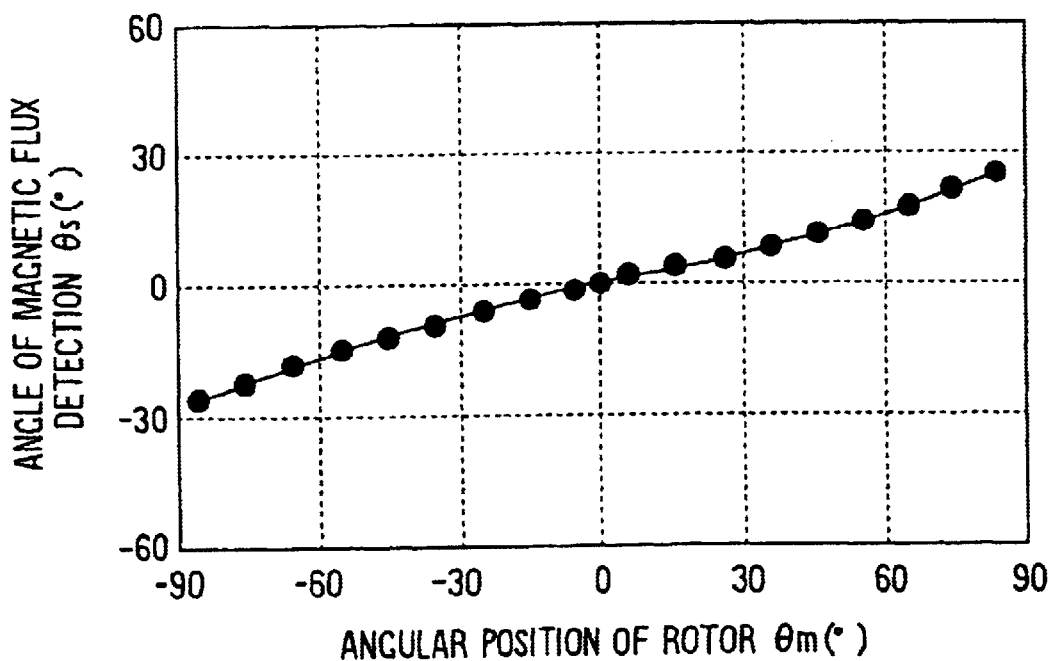
FIG. 7 is a diagram illustrating a change characteristic of the magnetic flux detection angle θs with respect to the rotor angular position θm.

When the rotor is rotated, the magnetic detecting element 13 is rotated along a circumference whose center corresponds to the rotation axis P of the rotor and whose radius is r. Next, an output change characteristic of the magnetic detecting element 13 will be explained. In a case where the magnetic detecting element 13 is the ferromagnetic thin film magnetic resistance element, the magnetic detecting element 13 outputs in proportion to sin 2 $\theta s$ in accordance with the magnetic flux detection angle $\theta s$. When the magnetic detecting element 13 is rotated on the circumference of radius r, a direction of the magnetic detecting element 13 is also rotated by the angular position $\theta m$ in proportion to the rotation of the angular position $\theta m$. As a result, a magnetic flux angular position $\theta s$, which is actually detected by the magnetic detecting element 13, is represented by ($\theta m - \theta j$), that is, subtraction of the magnetic field angle $\theta j$ from the angular position $\theta m$ of the magnetic detecting element 13. As a result, a relationship between the rotor angular position $\theta m$ and the magnetic detection angle $\theta s$ is shown as FIG. 7. As shown in FIG. 7, the magnetic detection angle $\theta m$ becomes smaller than the rotor rotation angle $\theta m$. This is a first point for improving a linearity of output from the magnetic detecting element 13. Here, in the embodiment as shown in FIGS. 6 and 7, the rotor angler position $\theta m$, the magnetic field angle $\theta j$, and the magnetic flux detection angle $\theta s$ have the following relation.

ROTOR ANGULAR POSITION $\theta m$
>MAGNETIC FIELD ANGLE $\theta j$
>MAGNETIC FLUX DETECTION ANGLE $\theta s$ As described above, the output from the magnetic detecting element 13 is proportionate to sin 2 $\theta s$. As shown in FIG. 4, when the magnetic flux detection angle $\theta s$ s is 0 degree, an output amplitude of the magnetic flux detecting element 13 becomes 0. Within a range of 0 degree<$\theta s$<45 degree, the output amplitude of the magnetic flux detecting element 13 gradually increases as the magnetic flux detection angle $\theta s$ increases. The output amplitude of the magnetic flux detecting element 13 becomes maximum when the magnetic flux detection angle $\theta s$ is 45 degrees.

Figure 8A:
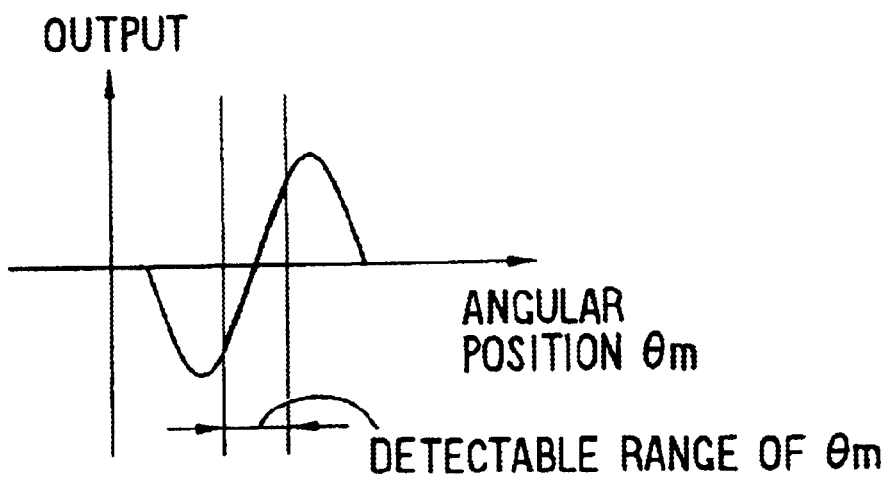
FIG. 8A is an output waveform of a conventional magnetic detecting element.
Figure 8B:
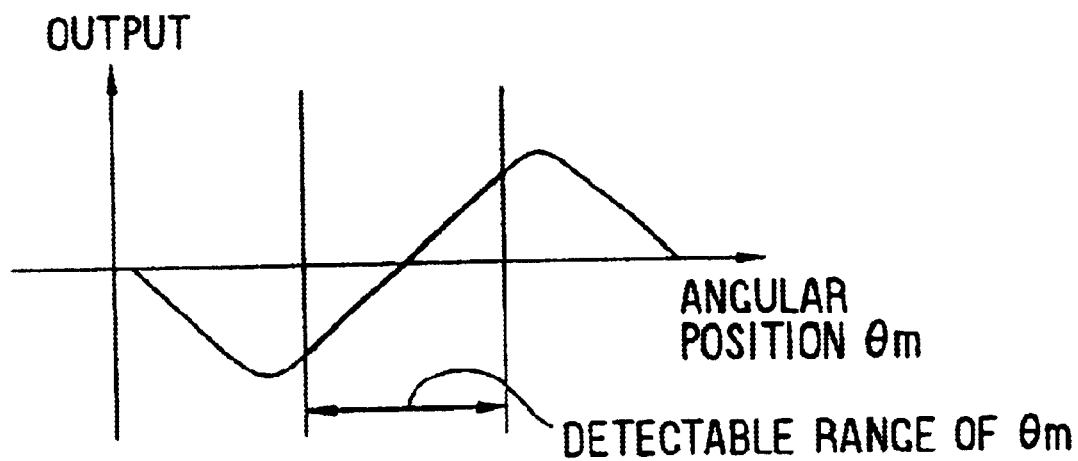
FIG. 8B is an output waveform of a magnetic detecting element of this embodiment.
Figure 22:
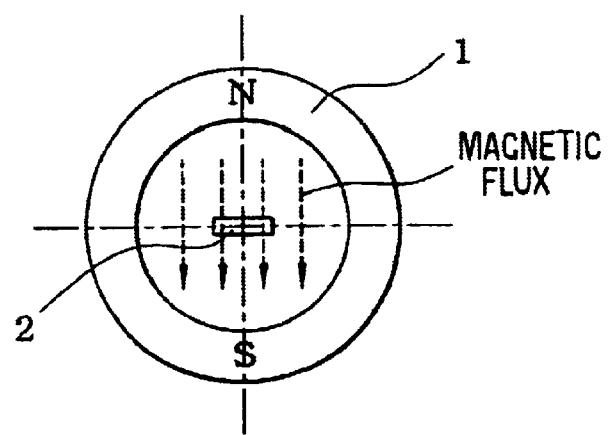
FIG. 22 is a plan view illustrating a conventional angular position detecting apparatus.

According to the conventional structure shown in FIG. 22, the rotor rotation angle $\theta m$ is equal to the magnetic flux detection angle $\theta s$, and the output from the magnetic flux detecting element 13 is a curve proportion to a trigonometric function (sin 2 $\theta m$). Therefore, as shown in FIG. 8A, a semi-linear output can be obtained at only a narrow range of the rotor angular position $\theta m$. As a result, the output change characteristic of the magnetic detecting element 2 with respect to the rotor angular position $\theta m$ becomes bad and the detectable angle range of the rotor angular position $\theta m$ becomes narrow.

On the contrary, according to this embodiment, as described above, the magnetic flux detection angle $\theta s$ becomes smaller than the rotor angular position $\theta m$ (first point), and the linearity of a wave form itself of the magnetic detecting element 13 can be improved as described later (second point). Therefore, the linearity of the output from the magnetic detecting element 13 can be secured within a considerably wider range (see FIG. 8B).

Next, an improvement of the linearity of the output waveform, which is the second point for improving the linearity of the output from the magnetic detecting element 13, will be explained.

It is assumed that the magnetic flux detection angle $\theta s$ and the rotor angular position $\theta m$ have a relationship of $\theta s = \theta m/3$ (see FIG. 9), and the output from the magnetic detecting element 13 becomes a trigonometric function proportionate to sin(2 $\theta m/3$). This structure can expand the detectable angle range of the rotor angular position $\theta m$, however, the structure can output only the semi-linear output. Therefore, it cannot be said that this structure improves the linearity of the outputs.

Figure 9:
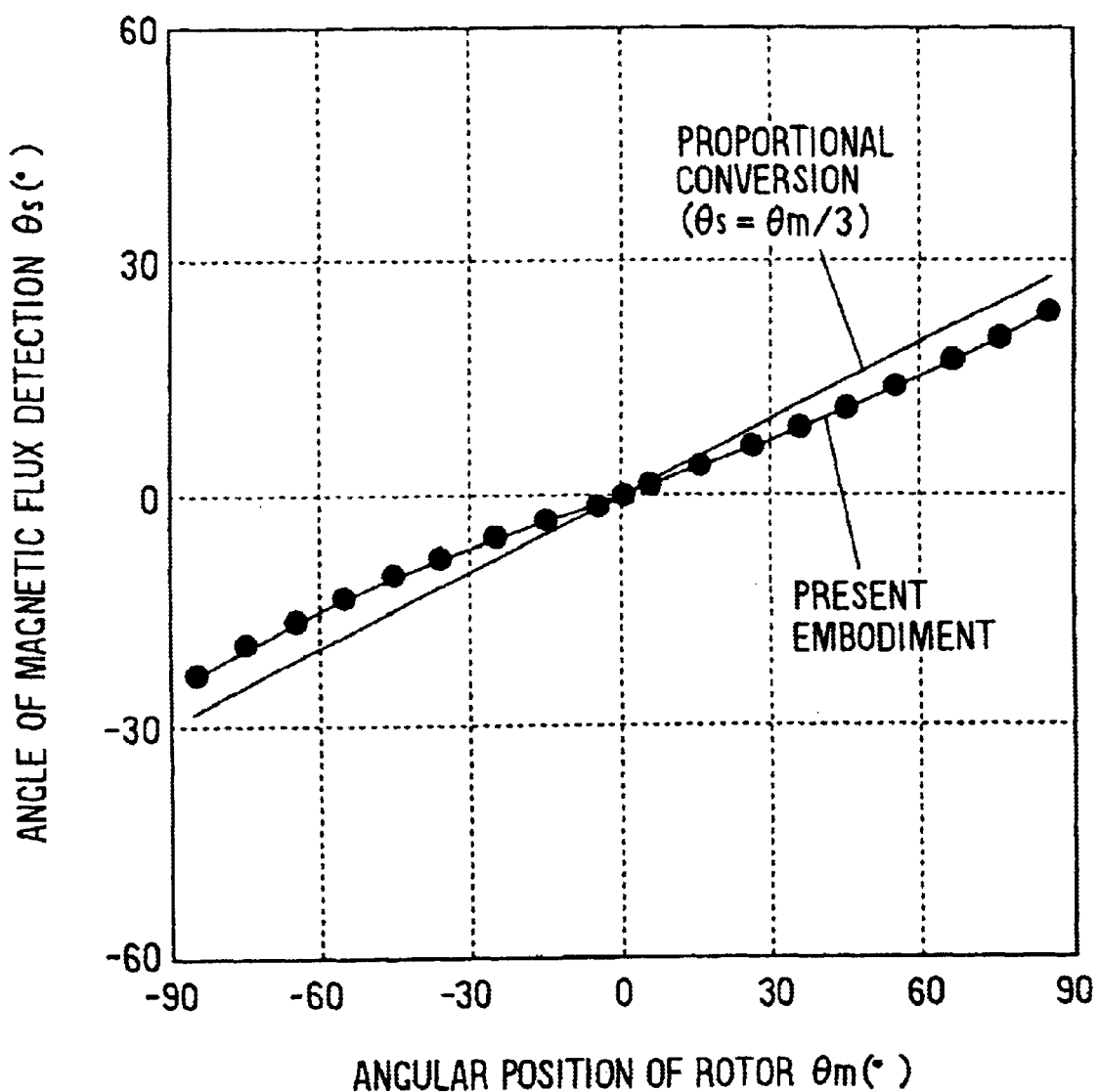
FIG. 9 is a diagram illustrating a difference between a magnetic field conversion of this embodiment and a simple proportional conversion.

On the contrary, according to this embodiment, as shown in FIG. 9, the relationship between the magnetic flux detection angle $\theta s$ and the rotor angular position $\theta m$ is not simple proportional relation, but is a non-linearity relationship. That is, when the rotor angular position $\theta m$ is small, a conversion rate of the magnetic flux detection angle $\theta s$ is large; whereas when the rotor angular position $\theta m$ is large, the conversion rate of the magnetic flux detection angle $\theta s$ is small. One reason for this is as follows. As shown in FIG. 5, the magnetic field occurs between the magnet 12 and the cylindrical yoke 11 does not spread uniformly, but changes in accordance with the rotor angular position $\theta m$. An amount of changing of the magnetic field angle $\theta j$ is firstly small in accordance with the rotor angular position, and is gradually increased as it approaches $\theta m = 90$ degree. As a result, when the rotor angular position $\theta m$ is small, the conversion rate of the magnetic flux detection angle $\theta s$ (=rotor angular position $\theta m$ − magnetic field angular $\theta j$) is large, and the conversion rate of the magnetic flux detection angle $\theta s$ becomes small as the rotor angular position $\theta m$ increases. This leads to an improvement in the linearity of the output of the magnetic detecting element 13.

Figure 10:
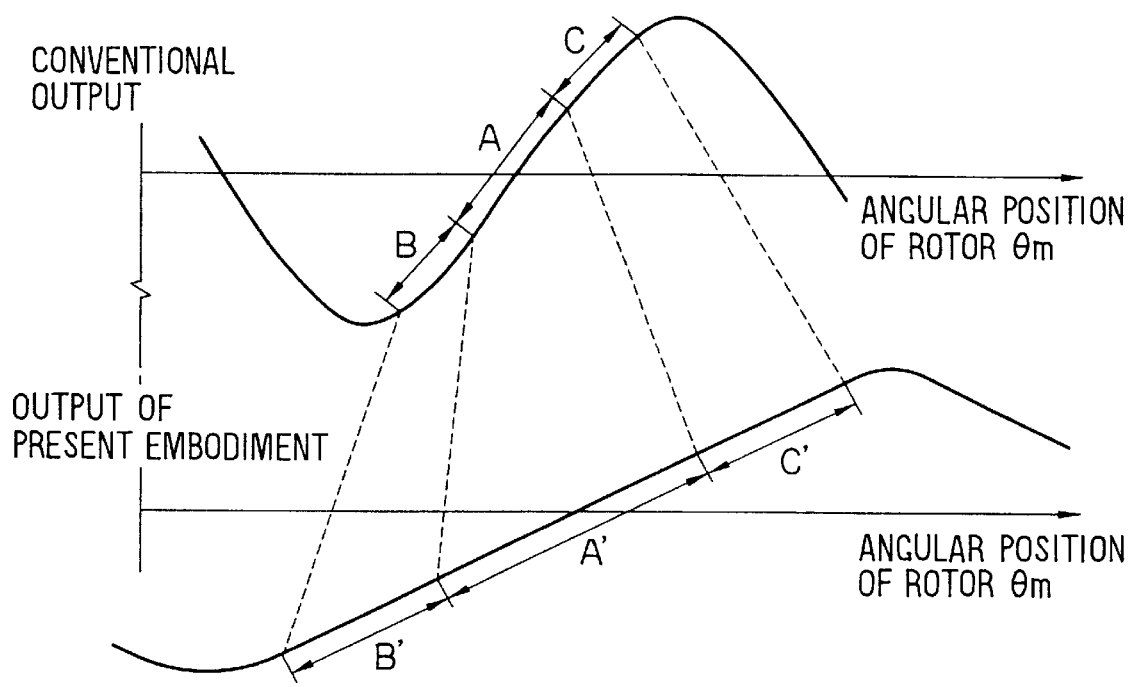
FIG. 10 is a diagram illustrating the improved linearity of output from the magnetic detecting element as a result of magnetic field conversion of this embodiment.

Specifically, as shown in FIG. 10, since the conventional output is represented by the trigonometric function, an inclination of a linear region A is large, and inclinations of linear regions B and C gradually decrease as the rotor angular position $\theta m$ becomes further apart. On the contrary, according to this embodiment, within a linear region A', the magnetic flux detection angle $\theta s$ changes so that an inclination of the output becomes smaller than that of the conventional output. Furthermore, within regions B' and C' at both sides of the linear region A', the magnetic flux detection angle $\theta s$ changes so that each of the inclinations of the outputs becomes larger than that of the conventional outputs. As a result, the regions B' and C' positioned at both sides of the linear region A' also become linear regions that continue to the linear region A', and therefore the linearity of the output from the magnetic detecting element 13 can be secured at a considerably wider range, and the detectable range of the rotor angular position θm can be considerably expanded compared to the conventional one.

Figure 11:
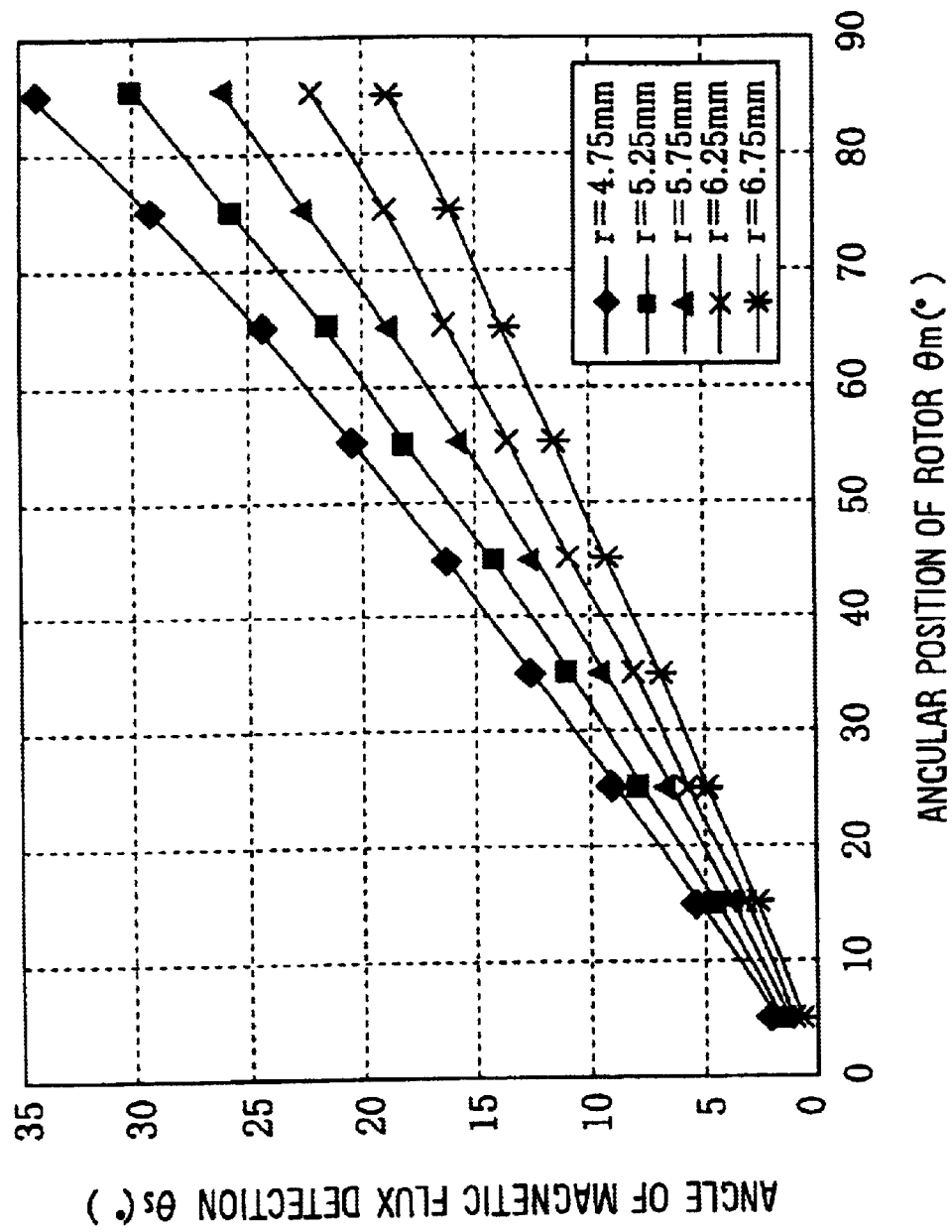
FIG. 11 is a diagram illustrating a relationship between a rotational radius r of the magnetic detecting element and a change characteristic of the magnetic flux detection angle θs.
Figure 12:
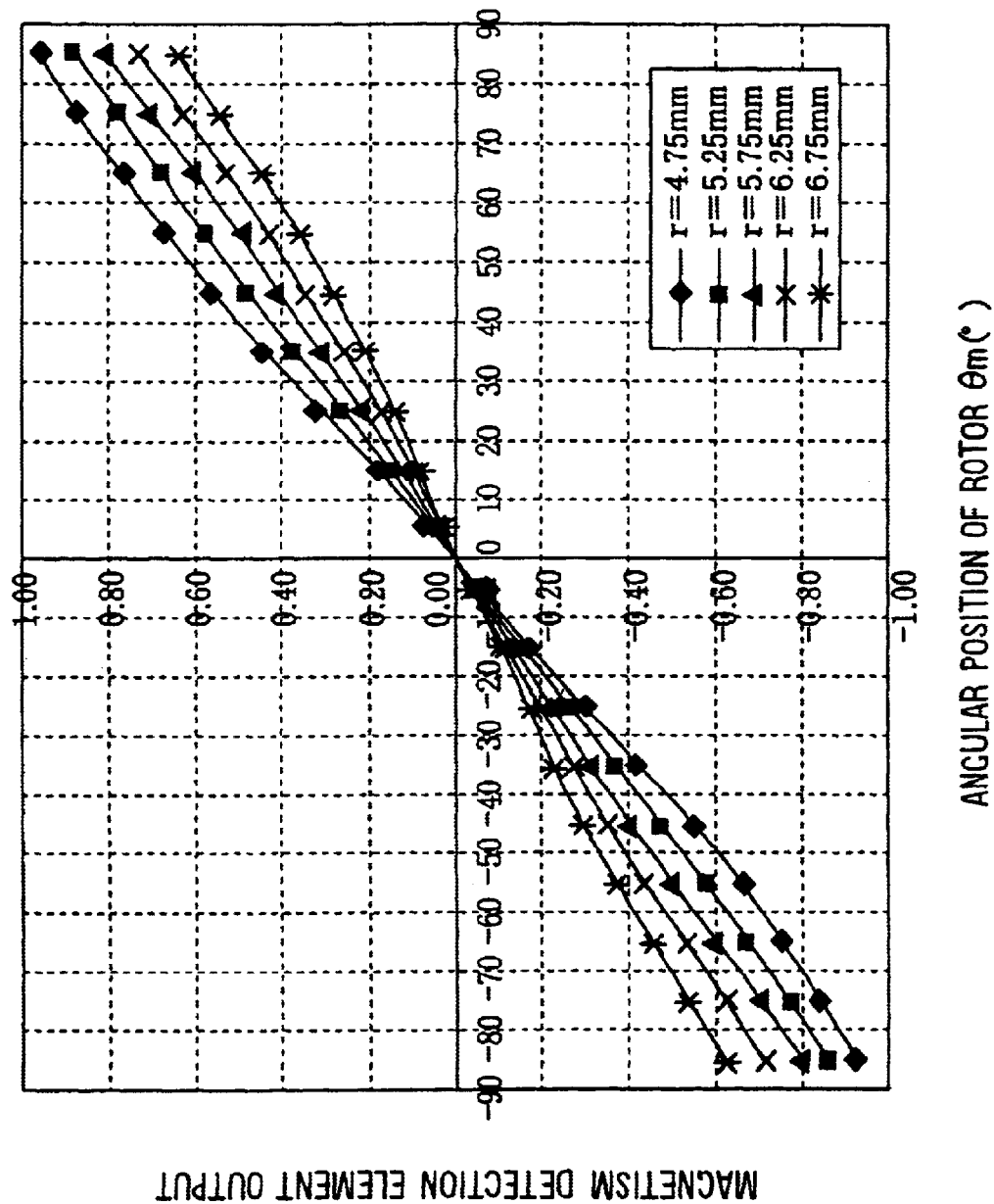
FIG. 12 is a diagram illustrating a relationship between a rotational radius r of the magnetic detecting element and an output change characteristic of the magnetic detecting element.

Incidentally, the relationship between the rotor angular position θm and the magnetic flux detection angular θs changes based on the rotational radius r of the magnetic detection sensor 13 (an amount of shift r from the rotation axis P), as shown in FIG. 11. Specifically, the larger the rotational radius r of the magnetic detecting element 13 becomes, the smaller the magnetic flux detection angle θs becomes. Since the output from the magnetic detecting element 13 becomes large in accordance with the change, when the radius r of the magnetic detecting element 13 changes, the output from the magnetic detecting element 13 also changes. Therefore, as shown in FIG. 12, the output change characteristic of the magnetic detecting element 13 can be changed by changing the rotational radius r of the magnetic detecting element 13. Thus, the output change characteristic can become linear, and can also be set to a curve having an upper convex or a curve having a lower convex.

Furthermore, the relationship between the rotor angular position θm and magnetic flux detection angle θs also changes based on the radius R of the cylindrical yoke 11 as well as the rotational radius r of the magnetic detecting element 13. Therefore, when one of the rotational radius r of the magnetic detecting element 13 and the radius R of the cylindrical yoke 11 is optionally determined, the output change characteristic of the magnetic detecting element 13 can be optionally determined to any one of the linear, the curve having upper convex, or the curve having lower convex.

Figure 13A:
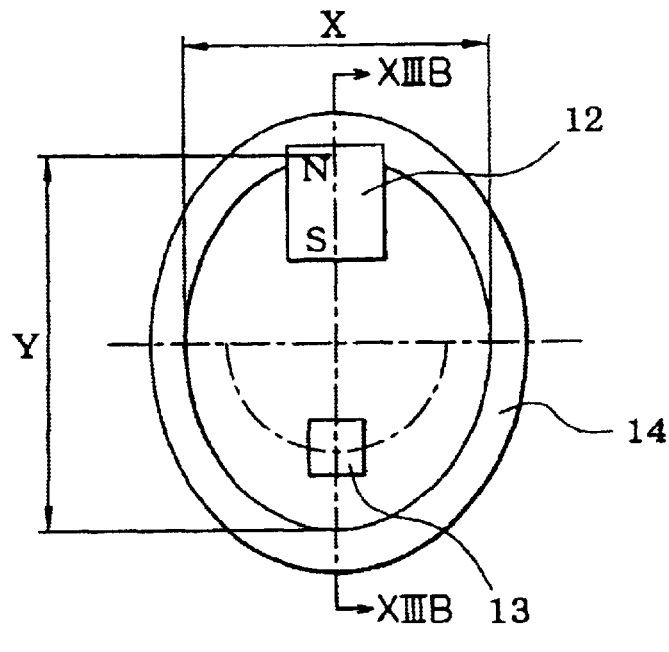
FIG. 13A is a plan view illustrating a main portion of an angular position detecting apparatus of a second embodiment according to the present invention.
Figure 13B:
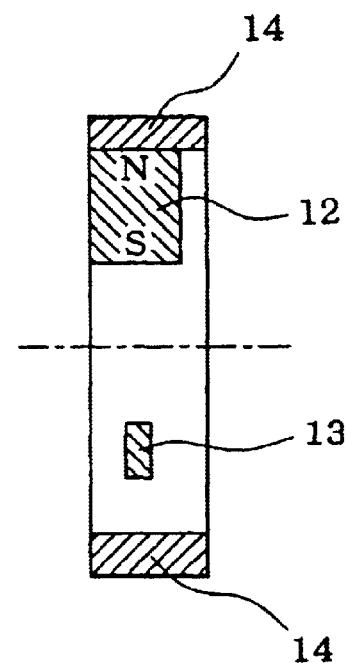
FIG. 13B is a vertical sectional view taken along a line XIIIB—XIIIB in FIG. 13A.
Figure 14A:
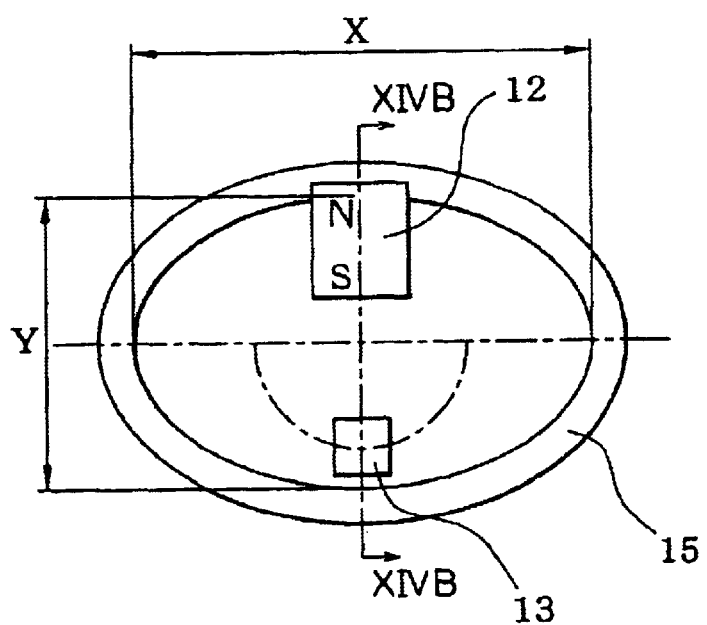
FIG. 14A is a planview illustrating a main portion of an angular position detecting apparatus of a third embodiment according to the present invention.
Figure 14B:
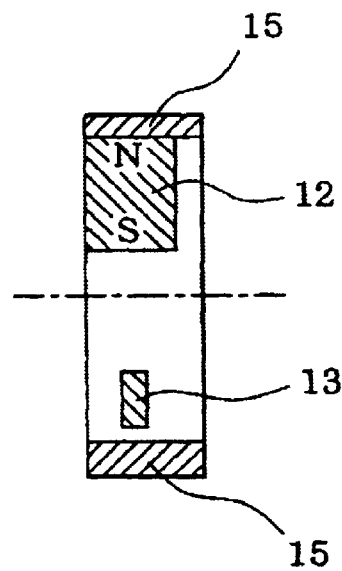
FIG. 14B is a vertical sectional view taken along a line XIVB—XIVB in FIG. 14A.
Figure 15A:
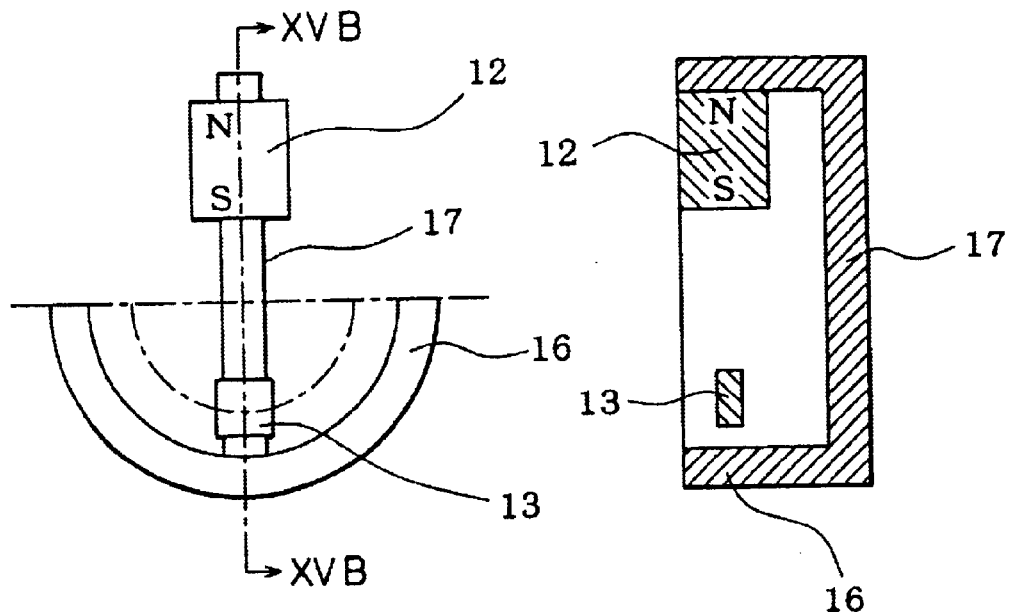
FIG. 15A is a plan view illustrating a main portion of an angular position detecting apparatus of a fourth embodiment according to the present invention.
Figure 15B:
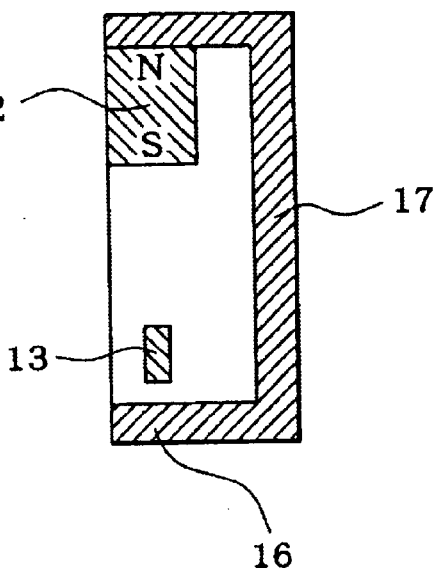
FIG. 15B is a vertical sectional view taken along a line XVB—XVB in FIG. 15A.

Here, the cylindrical yoke 11 is applied in the first embodiment, however, a shape of the yoke may be changed to an ellipse shape by arranging a ratio of internal radiuses X and Y such as yokes 14 and 15 shown in FIGS. 13 and 14 as a second and a third embodiment, respectively. Furthermore, the shape of the yoke 16 may be changed to a circular arc (one part of a cylinder) or to an ellipse arc (one part of an ellipse cylinder),as shown in FIG. 15 as a fourth embodiment. In short, an internal surface of the yoke is set to a curved surface having a gentle radius of curvature, so that magnetic filed distribution is gradually changed in proportion to the rotor angular position θm. Here, in the embodiment as shown in FIG. 15, one pole of the magnet 12 is fixed to a magnetic circuit formation member 17 that is provided at the yoke 16, and another pole of the magnet 12 is confronted with the center position of the yoke 16.

Furthermore, in the above embodiment, the center of the yoke and the rotation axis of the magnetic detecting element 13 (rotation axis) are matched to each other, however, these are not needed to be matched. Here, it is preferable to arrange one pole of the magnet 12 positioned toward the center portion of the yoke. As a result, the magnetic field distribution (direction and intensity) occurring between the magnet 12 and the yoke can be symmetrical with respect to the center line connecting the magnet 12 and the center of the yoke.

Figure 16:
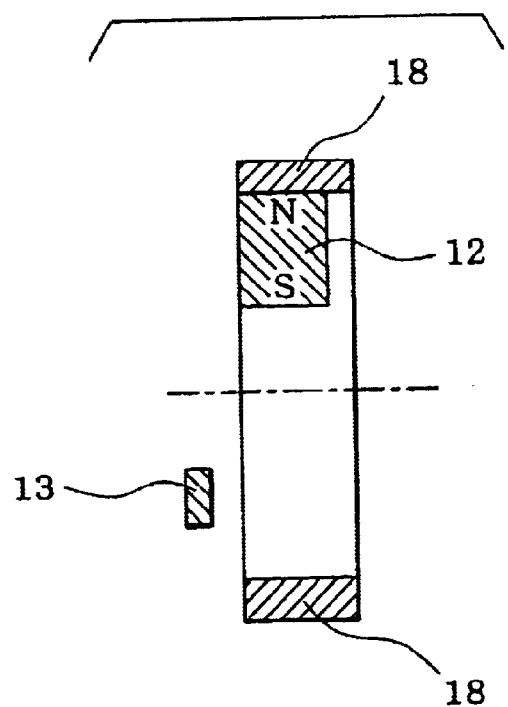
FIG. 16 is a vertical sectional view illustrating a main portion of an angular position detecting apparatus of a fifth embodiment according to the present invention.
Figure 17:
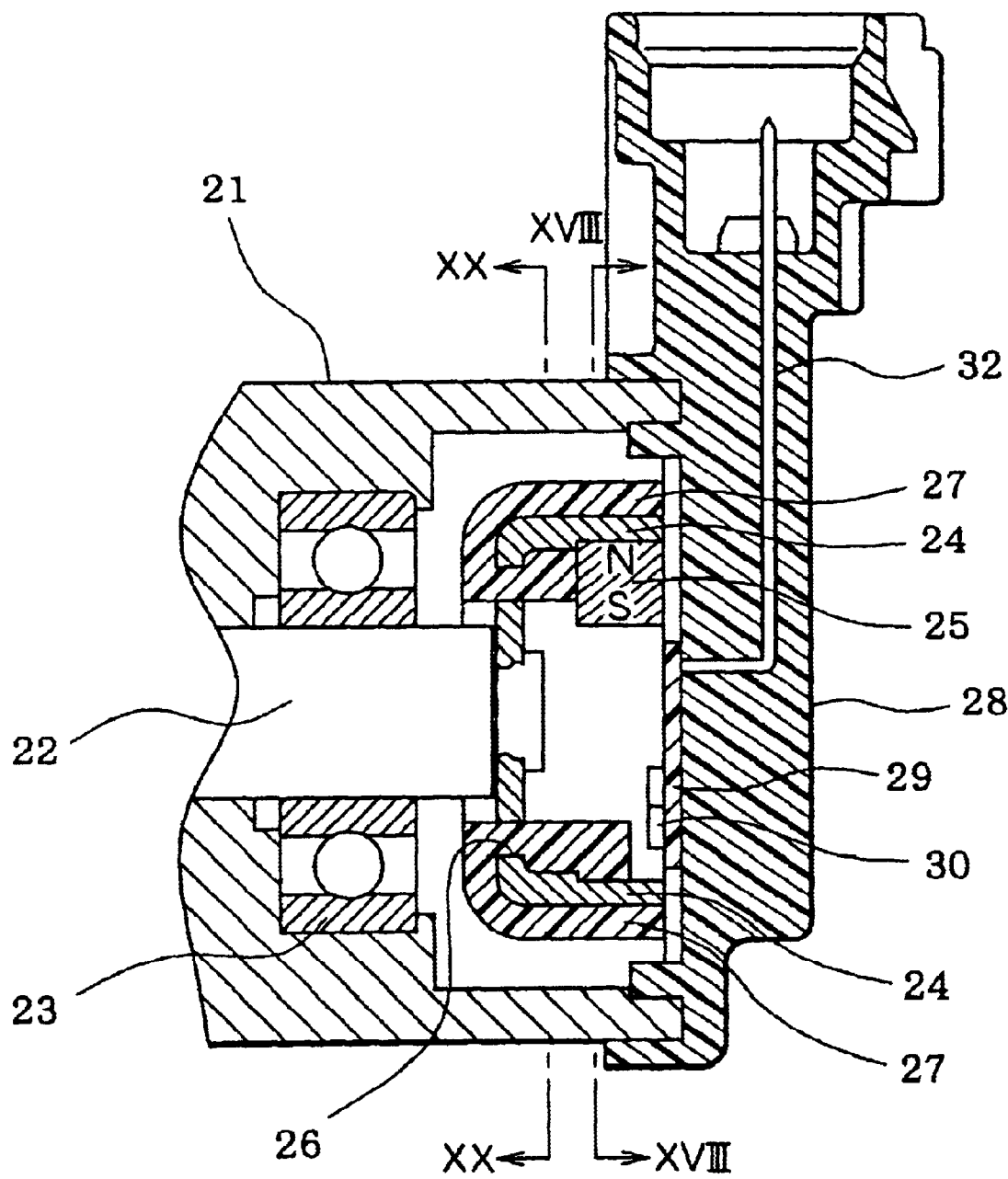
FIG. 17 is a vertical sectional view illustrating an angular position detecting apparatus of a sixth embodiment according to the present invention.

Moreover, in each of the embodiments, the magnetic detecting element 13 does not need to be arranged at the inner space of the yoke. As shown in FIG. 16, as a fifth embodiment, the magnetic detecting element 13 may be arranged around a front portion of the yoke 18 or around a rear portion thereof. In short, the magnetic detecting element 13 may be arranged anywhere as long as it is arranged in the magnetic field generated between the magnet 12 and the yoke 18.

In general, when the temperature of the magnet 12 changes, magnetic field intensity changes without changing the magnetic flux angle θs. However, when the output from the magnetic detecting element is changed as a result of changing of the magnetic field intensity due to the temperature changes, the detection value of the magnetic flux angle θs causes error. In such a case, there is a need to correct the change of the magnetic field intensity due to the temperature change of the magnet 12.

Therefore, according to each of the embodiments, it is preferable to apply the magnetic field having an intensity so that the output saturates when using the ferromagnetic thin film magnetic resistance element as the magnetic detecting element 13. When the magnetic field having an intensity so that the output saturates is applied, the ferromagnetic thin film magnetic resistance element generates outputs depending only the magnetic flux angle θs, independent of the magnetic field intensity. Therefore, even if the magnetic field intensity is changed due to the temperature changes of the magnet 12, the magnetic flux angle θs can be accurately directly detected without any influence from the change in the magnetic field intensity. Hence, it does not need to correct the change of the magnetic field intensity due to the temperature change of the magnet 12.

However, in the present invention, a magnetic detecting element that generates outputs in proportion to magnetic field intensity from one direction, such as a Hall element or a semiconductor magnetic resistance element, may be used. These elements cannot directly detect the magnetic flux different from the ferromagnetic thin film magnetic resistance elements. Therefore, when one element is used, two elements may be perpendicularly arranged with each other so as to calculate an angle of the magnetic flux based on a ratio of outputs from each element.

Furthermore, in each embodiment, the magnetic detecting element is rotated by fixing to the rotor; however, the yoke and the magnet may be rotated by fixing to the rotor.

Next, a sixth embodiment in which the present invention is further specified will be explained with reference to FIGS. 17 to 20. A rotation shaft 22 (rotor) of a target detection object such as a throttle valve is rotatably supported to a main housing 21 of an angular position detecting apparatus via a bearing 23. A cylindrical yoke 24 having a cup shape is fixed to a tip portion (right edge portion) of the rotation shaft 22 by using swaging or the like. At a predetermined position of an inside portion of the cylindrical yoke 24, a magnet 25 such as ferrite magnet is fixed by using resin mold or the like. The magnet 25 is magnetized along a radial direction of the cylindrical yoke 24, such that an S-pole is positioned toward a center portion of the cylindrical yoke 24 and an N-pole is contacted with the cylindrical yoke 24. Here, positions of the S-pole and N-pole of the magnet 25 may be exchanged therebetween.

Figure 20:
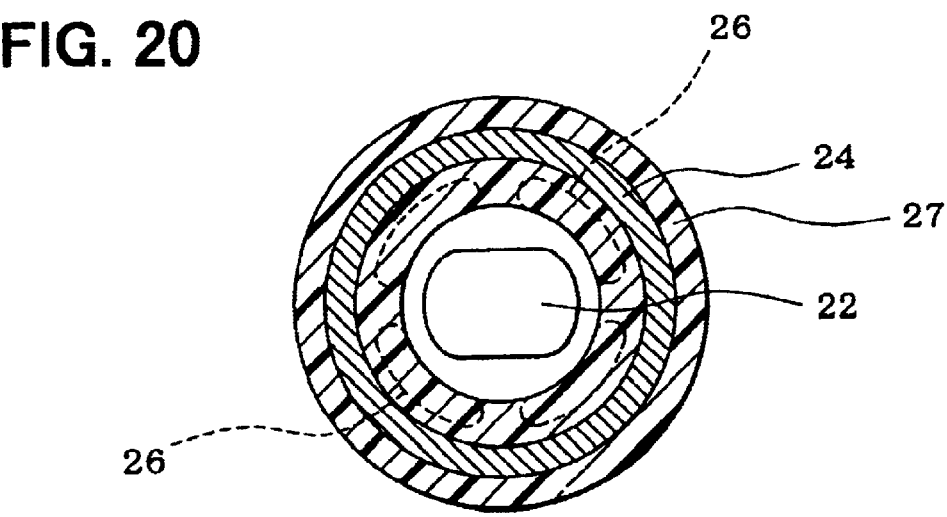
FIG. 20 is a vertical sectional view taken along the line XX—XX in FIG. 17.

Plural through holes for preventing short-circuit of the magnetic flux are provided to a left side portion of the cylindrical yoke 24 so as to surround the rotation shaft 22 (see FIG. 20). An outer side portion of the cylindrical yoke 24 is molded by a resin 27.

A connector housing 28 is assembled to a right side portion of the main housing 21 so as to cover an opening of the cylindrical yoke 24. A substrate 29 for wiring is fixed to an inner side of the connector housing 28 by resin molding of a substrate-fixing portion 31 (FIG. 18) or by swaging. For example two magnetic detecting elements 30 are mounted on the substrate 29. Each of he magnetic detecting elements 30 is arranged on a circumference of radius r whose center is the rotation axis of the cylindrical yoke 24 with an angular pitch of, for example, 90 degrees. Each of the magnetic detecting elements 30 is arranged in the magnetic field generated between the magnet 25 and the cylindrical yoke 24. Similar to the above embodiment, each of the magnetic detecting elements 30 is selected from the ferromagnetic thin film magnetic resistance element, and the magnetic field has an intensity so that the output of this element saturates when applied thereto. As a result, each of the magnetic detecting elements 30 generates outputs similar to the trigonometric function depending on only the magnetic flux detection angle θs independent of the intensity of the magnetic field. When two magnetic detecting elements 30 are applied like in this case, the rotor angular position θs can be detected by ascertaining whether there is abnormality or not by comparing the magnetic flux angles θs detected by the two magnetic detecting elements 30. An input/output terminal of each magnetic detecting element 30 is connected to a terminal 32 in the connector housing 28 via a wire pattern of the substrate 29.

Figure 18:
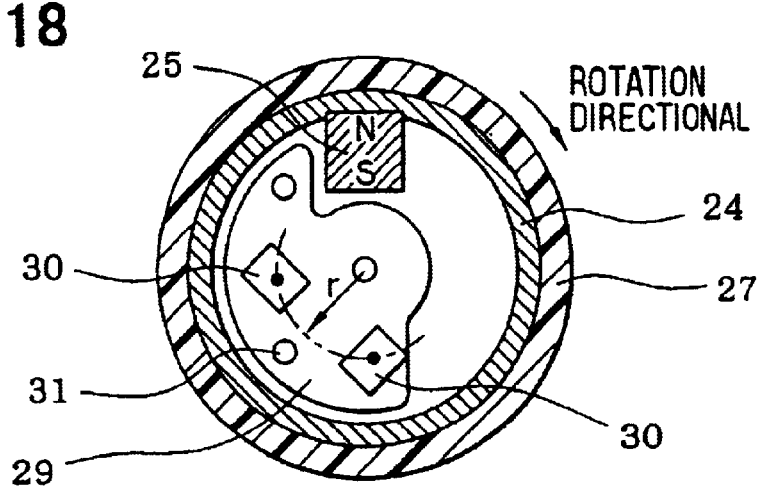
FIG. 18 is a vertical sectional view taken along a line XVIII—XVIII in FIG. 17, when a magnet and a cylindrical yoke are rotated to a clockwise with respect to a substrate.
Figure 19:
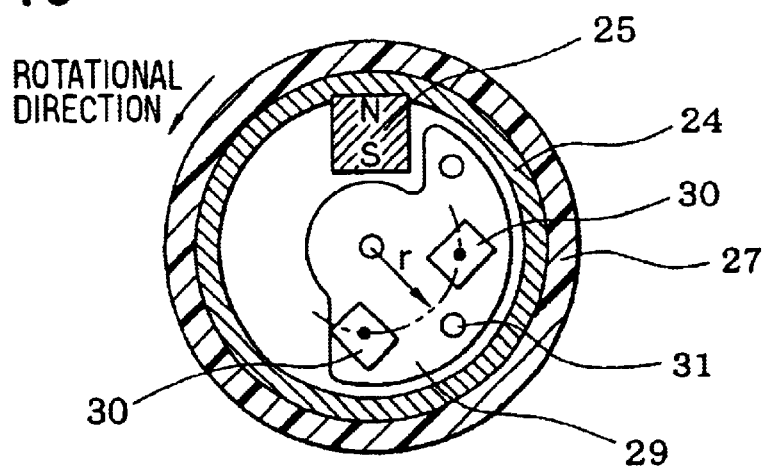
FIG. 19 is a vertical sectional view taken along the line XVIII—XVIII in FIG. 17, when the magnet and the cylindrical yoke are rotated counterclockwise with respect to the substrate.

Here, FIG. 18 shows an example in which the magnet 25 and the cylindrical yoke 24 are rotated toward a clockwise direction; and FIG. 19 shows an example in which the magnet 25 and the cylindrical yoke 24 15 are rotated toward a counterclockwise direction. In each of these cases, the substrate 29 has a notch at a portion corresponding to a rotation range of the magnet 25 so that the magnet 25 does not touch the substrate 29.

According to the sixth embodiment the two magnetic detecting elements 30 are arranged on the circumference of radius r with the angular pitch of 90 degrees; however, they may be arranged with another angular pitch. Furthermore, the number of the magnetic detecting elements 30 is not limited to two, but may be one or three or more.

Figure 21:
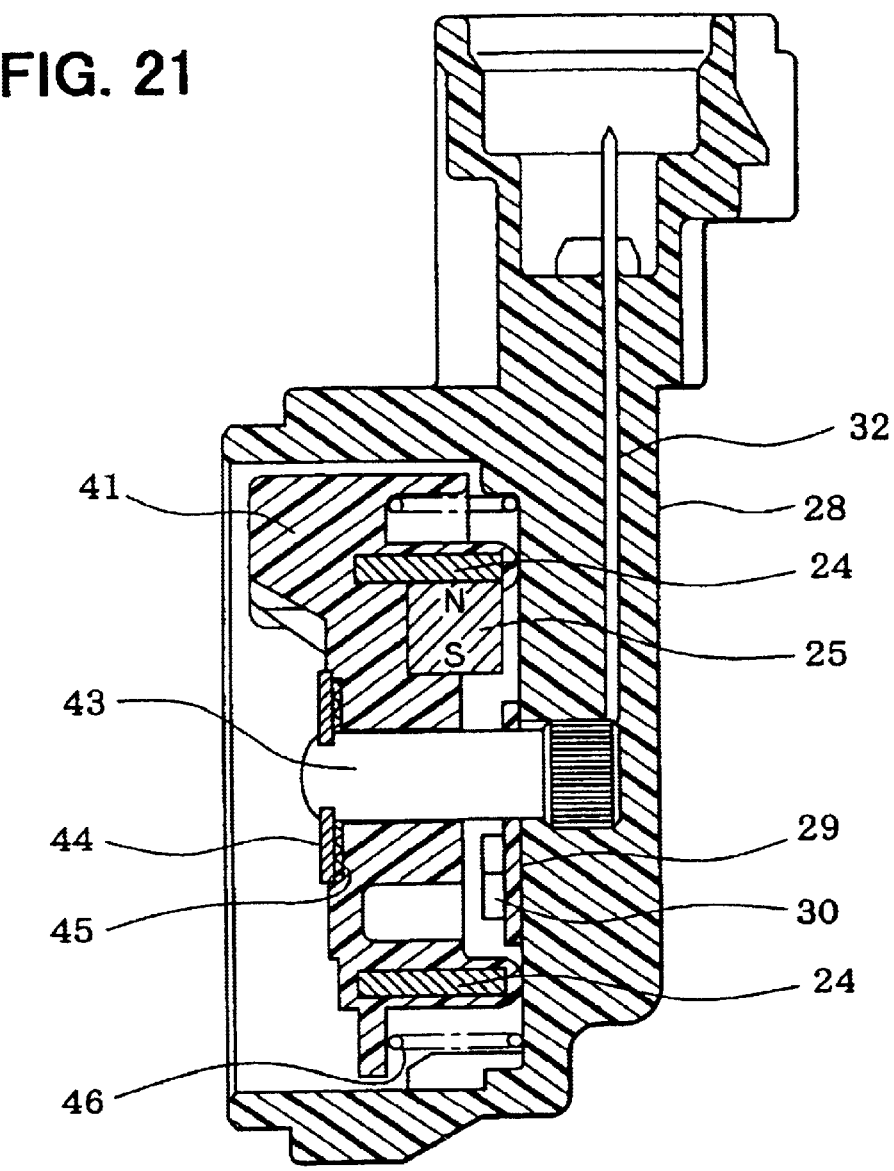
FIG. 21 is a vertical sectional view illustrating an angular position detecting apparatus of a seventh embodiment according to the present invention.

Next, a seventh embodiment of the present invention will be explained with reference to FIG. 21. Here, portions which are substantially the same as those of the sixth embodiment have the same reference number to eliminate the need for a detailed explanation.

In this seventh embodiment, a rotation lever 41 for connecting to the target detection object is formed by molding the cylindrical yoke 24 and the magnet 25 by using resin. The rotation lever 41 is rotatably supported by a rotation shaft 43 which is fixed to the connector housing 28 by being inserted and which is made of non-magnetic material. A stopper plate 44 prevents the rotation lever 41 from being removed from the rotation shaft 43. A spring washer 45 for restricting movement of the rotation lever along a thrust direction is sandwiched between the stopper plate 44 and the rotation lever 41. The rotation lever 41 is forced to a predetermined rotational direction by a twist coil spring 46, and automatically returns to an initial position by the spring force. The other structures are substantially the same as those of the sixth embodiment.

Figure 23:
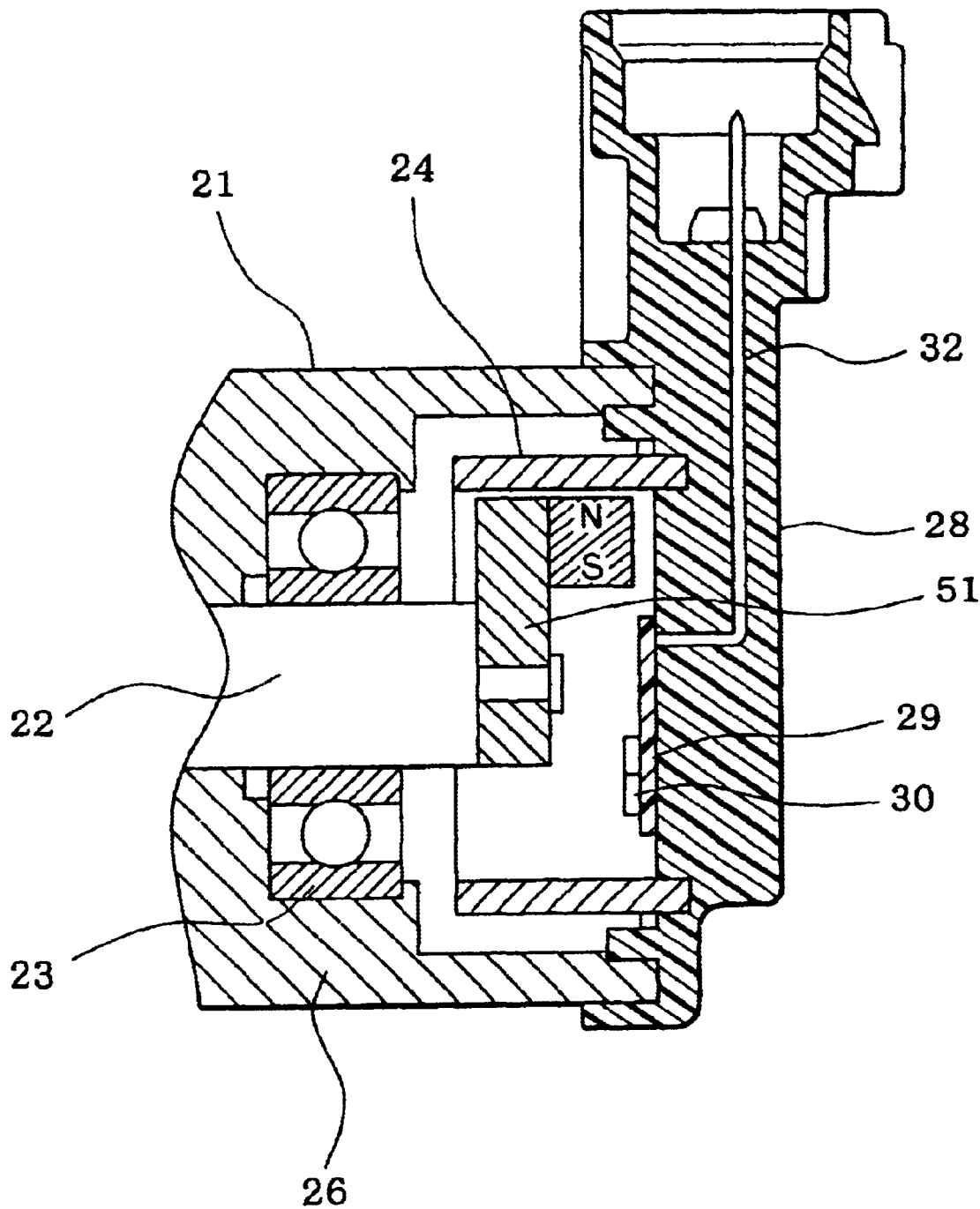
FIG. 23 is a vertical sectional view illustrating an angular position detecting apparatus of an eighth embodiment according to the present invention.
Figure 24:
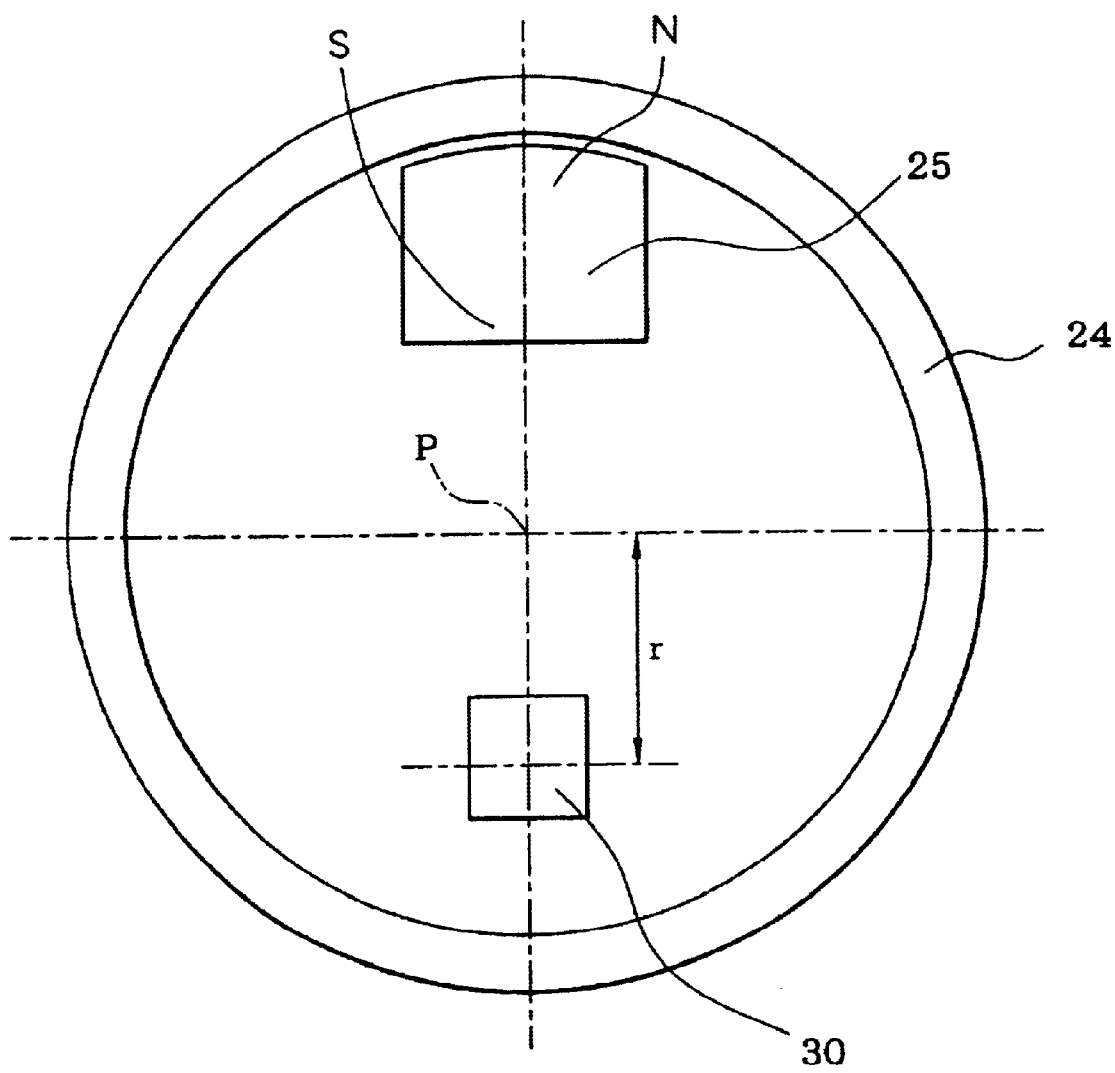
FIG. 24 is a plan view illustrating a relationship of arrangements of the yoke, the magnet, and the magnetic detecting element of the eighth embodiment.

In each embodiment described above, the yoke and the magnet are fixed at the same side (rotor or non-rotation portion) so that the yoke and the magnet are integrally rotated or kept a non-rotational condition; however, the yoke and the magnetic detecting element may be fixed to the same side (rotor or non-rotation portion) so that the yoke and the magnetic detecting element are integrally rotated or kept in a non-rotational condition. Here, an eighth embodiment in which this modification is actualized will be explained with reference to FIGS. 23 and 24. Here, portions with are substantially the same as those of the sixth embodiment (FIG. 17) have the same reference number to eliminate the need for a detailed explanation.

In the eighth embodiment, the cylindrical yoke 24 is fixed inside of the connector housing 28 by insert-forming or the like. The cylindrical yoke 24 is concentrically arranged with the rotation shaft 22. An arm 51 made of non-magnetic material is fixed to the tip portion of the rotation shaft 22. The magnet 25 is fixed to a side surface of a tip portion of the arm 51 by using adhesive or the like. The magnet 25 is confronted to an inner surface of the cylindrical yoke 24 with a small gap interposed therebetween. The magnet 25 is magnetized toward a radial direction of the cylindrical yoke 24, such that an S-pole is positioned toward a center portion P of the cylindrical yoke 24 and an N-pole is contacted with the inner surface of the cylindrical yoke 24. An N-pole magnetized surface of the magnet 25 is formed in a circular arc shape so as to reduce the gap (magnetic resistance) between the N-pole magnetized surface of the magnet 25 and the cylindrical yoke 24. Here, positions of the S-pole and the N-pole of the magnet 25 may be exchanged with respect to FIG. 23. Here, the magnetic detecting element 30 fixed inside of the connector housing 28 is arranged in a magnetic field generated between the magnet 25 and the cylindrical yoke 24, and is apart from the center portion P of the cylindrical yoke 24 by a predetermined distance r.

When the yoke 24 has a cylindrical shape like the eighth embodiment, there is no affect on the distribution of the magnetic field in the yoke 24, independent of whether the yoke 24 rotates or not. Therefore, when the magnetic resistance between the magnet 25 and the cylindrical yoke 24 is reduced by arranging the magnet 25 near the inner surface of the cylindrical yoke 24, it can form a magnetic field having almost the same distribution as that of the case where the magnet 25 is fixed to the cylindrical yoke 24. Thus, the direction of the magnetic field with respect to the magnetic detecting element 30 changes in proportion to the angular position. As a result, the angular position can be detected based on the output from the magnetic detecting element 30, and the same result as in the first embodiment can be obtained.

Here, in the eighth embodiment, the shape of the yoke is not limited to the cylindrical shape. For example, the shape of the yoke may be one part of a cylinder. In short, any shape may be acceptable as long as the direction of the magnetic field is changed in proportion to the angular position within the detectable angle range. Furthermore, the yoke and the magnetic detecting element may be fixed to the rotor and the magnet may be fixed to a non-rotation portion such as the housing.

Figure 25:
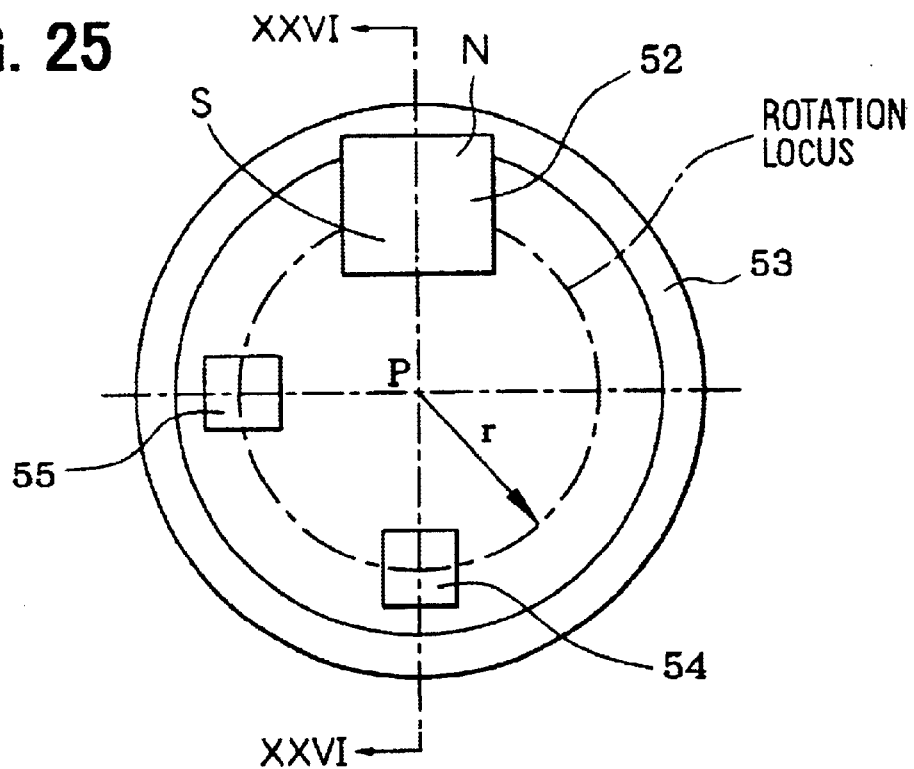
FIG. 25 is a plan view illustrating a relationship of arrangements of the yoke, the magnet, and the magnetic detecting element of a ninth embodiment.
Figure 26:
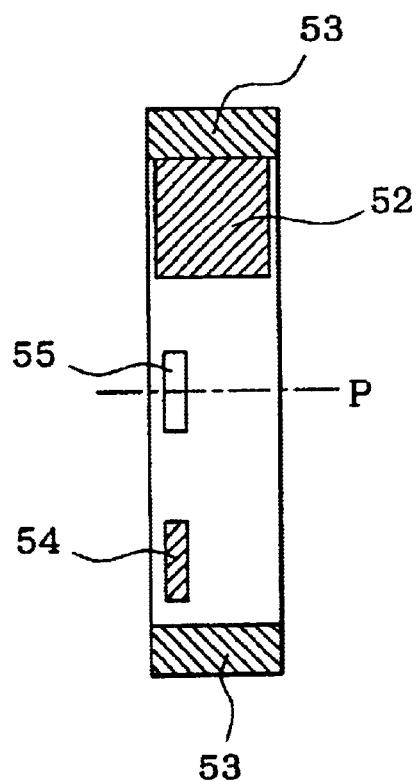
FIG. 26 is a vertical sectional view taken along the line XXVI—XXVI in FIG. 25.

Next, a ninth embodiment of the present invention will be explained with reference to FIGS. 25 to 31. In the ninth embodiment, as shown in FIGS. 25 and 26, a cylindrical yoke 53 to which a magnet 52 is fixed is concentrically fixed to a rotor (not-shown) that is connected to the target detection object. Incidentally, two magnetic detecting elements 54 and 55 each of which is fixed to a non-rotation portion (not-shown) of a housing or the like are arranged on the circumference of radius r whose center is a rotation axis P of the cylindrical yoke in magnetic field with the angular pitch of 90 degrees, and are arranged in a magnetic field generated between the magnet 52 and the cylindrical yoke 53. Thus, each of two magnetic detecting elements 54 and 55 is arranged so that a range of angular position in which the output change characteristic becomes linear (linear region) is different from each other.

Figure 28:
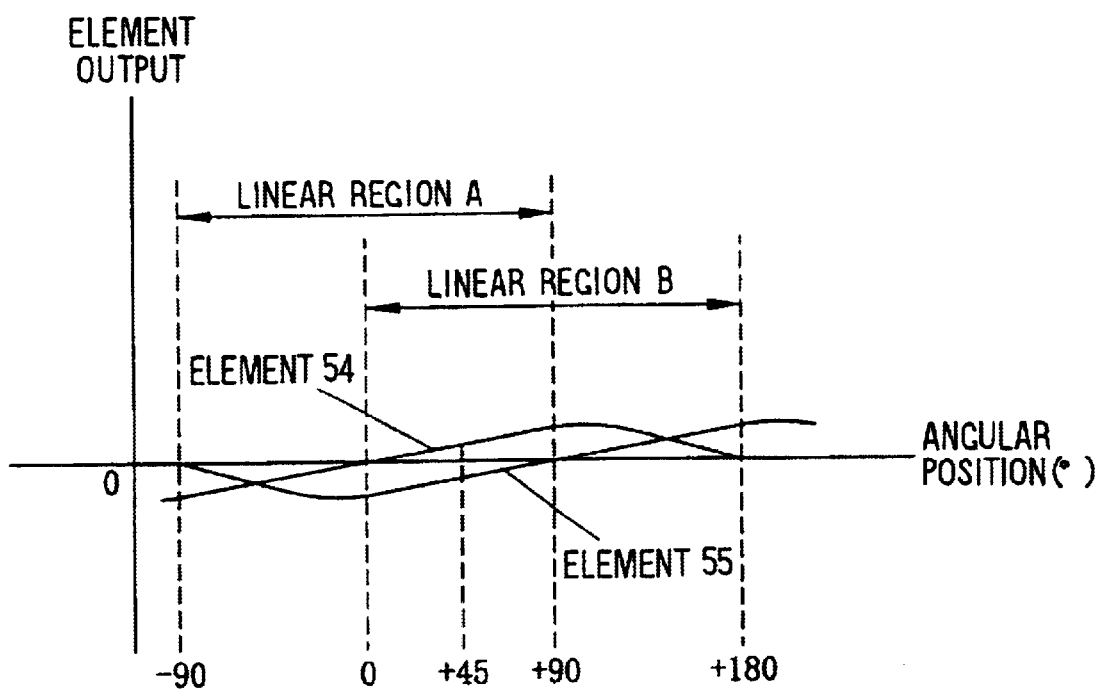
FIG. 28 is an output waveform of the two magnetic detecting elements of the ninth embodiment.

As shown in FIG. 25, an angular position where one magnetic detecting element 54 positions on a center line XXVI—XXVI is 0 degrees, and counterclockwise direction is defined as a positive direction of the angular position. In this case, as shown in FIG. 28, outputs of the one magnetic detecting element 54 shows a minimum at −90 degree, and shows a maximum at 0 degree and at +90 degree. On the contrary, outputs of another magnetic detecting element 55 shows a minimum at 0 degree, and shows a maximum at 0 degree and at +180 degree. Therefore, each of the outputs of the two magnetic detecting elements 54 and 55 has the same waveform but whose phases are shifted by 90 degree each other. That is, the linear region A of the outputs of the one magnetic detecting element 54 and the linear region B of the outputs of another magnetic detecting element 55 are shifted by 90 degree in phase.

Figure 27:
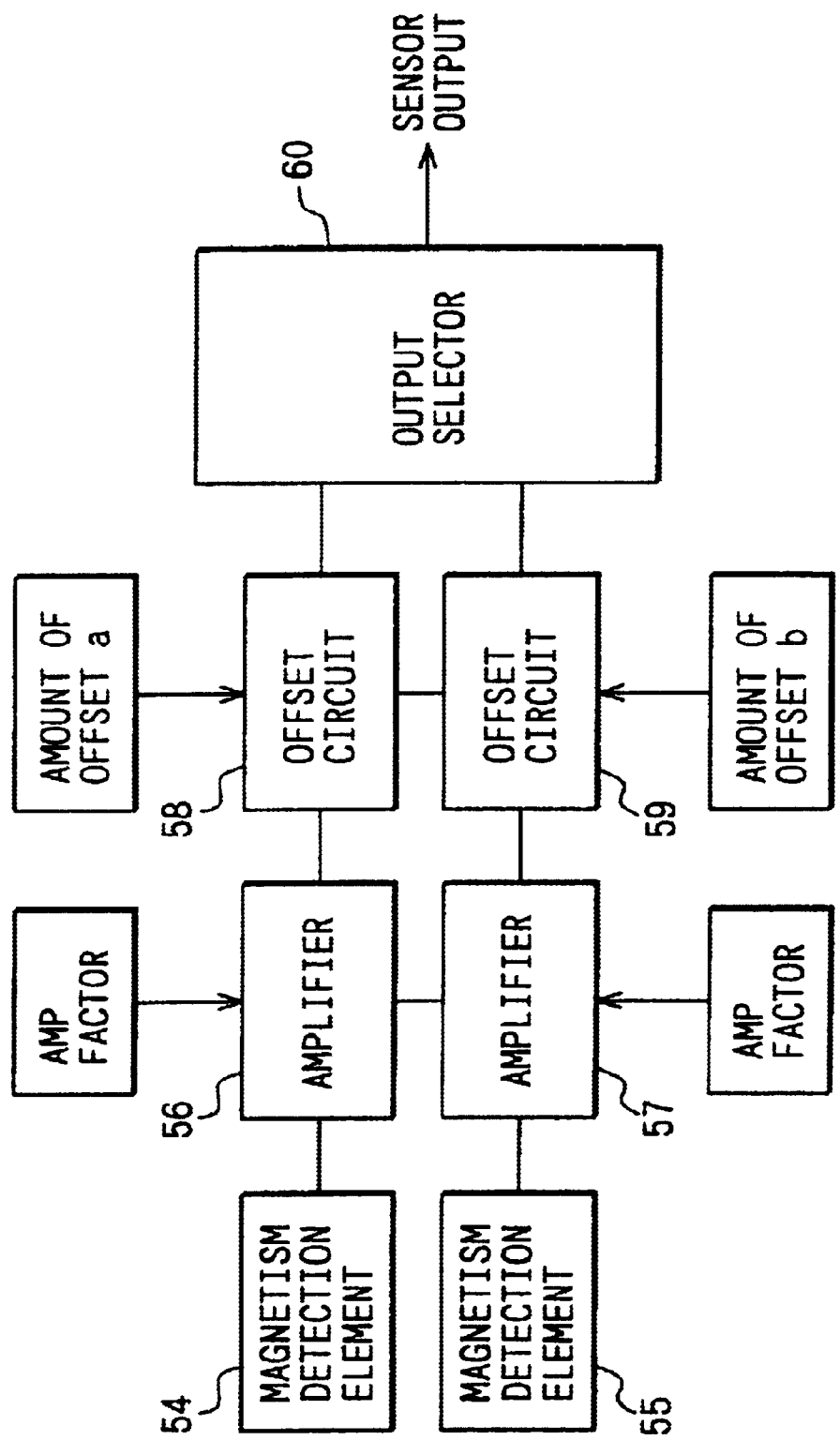
FIG. 27 is a block diagram illustrating a process circuit for the output of two magnetic detecting elements of the ninth embodiment.
Figure 29:
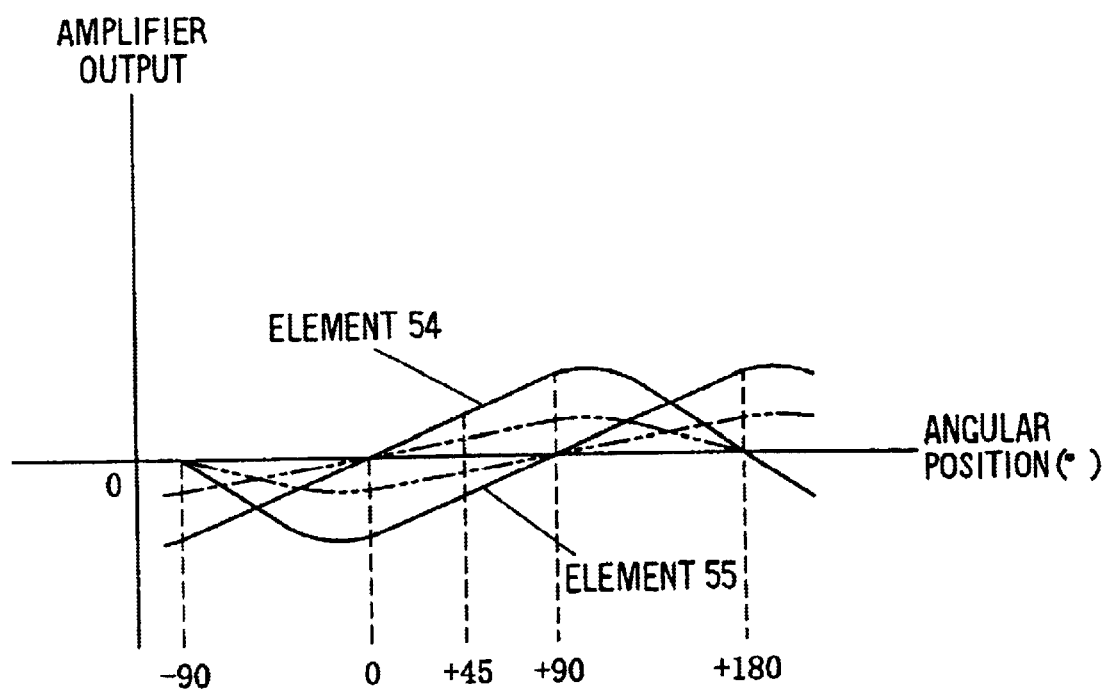
FIG. 29 is an output waveform of two amplifiers of the ninth embodiment.
Figure 30:
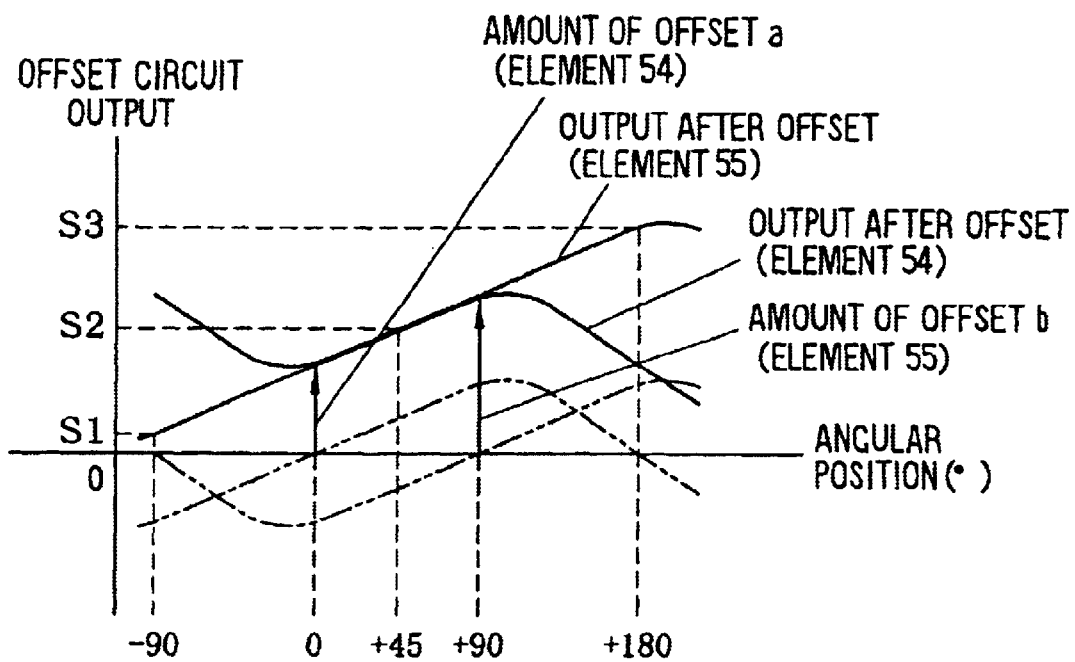
FIG. 30 is an output waveform of two offset circuits of the ninth embodiment.
Figure 31:
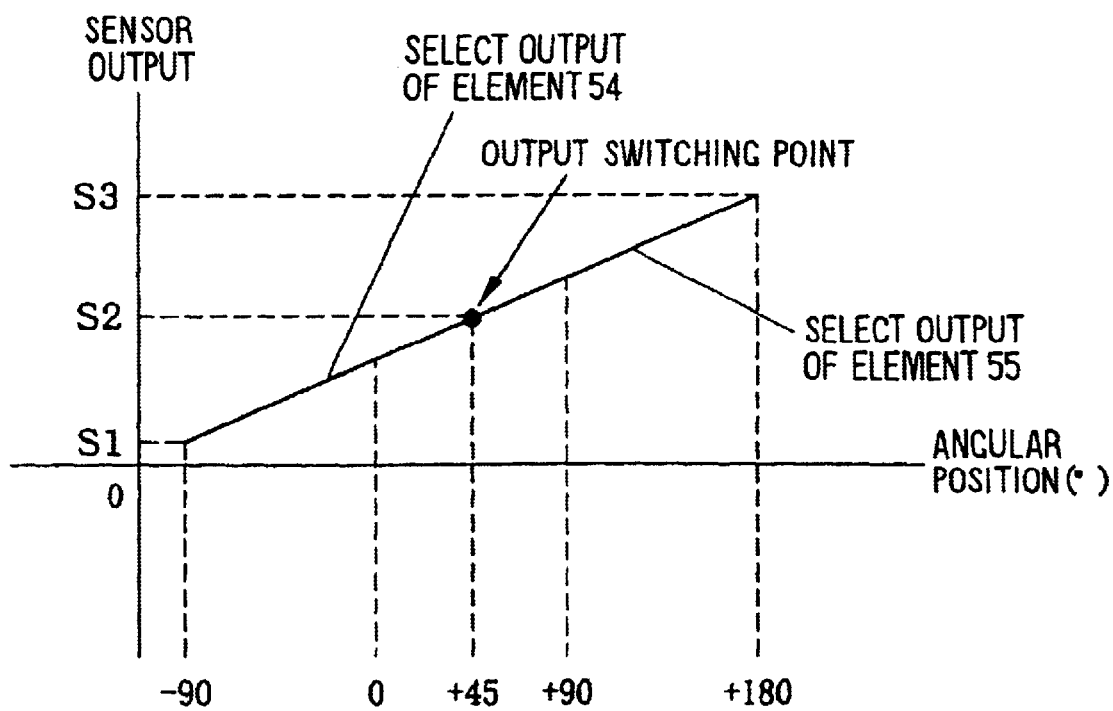
FIG. 31 is a final output waveform of the magnetic detecting apparatus of the ninth embodiment.
Figure 32:
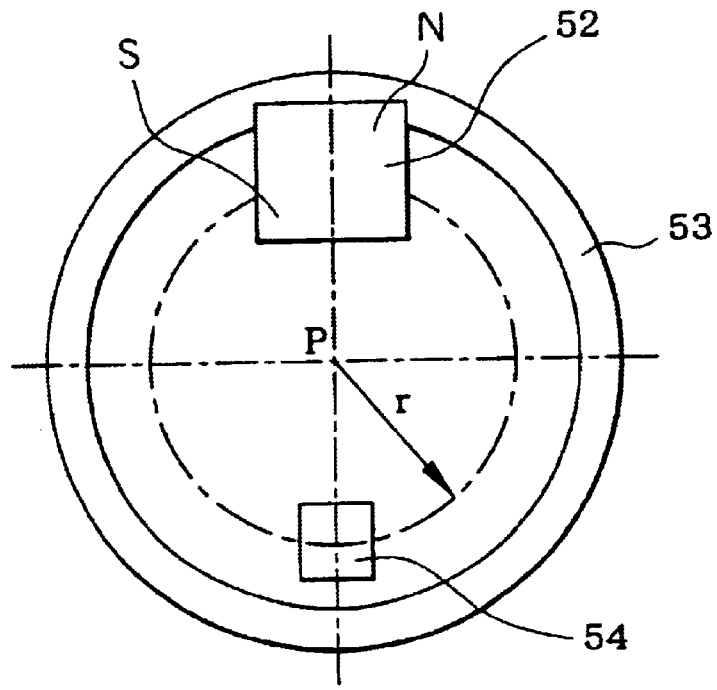
FIG. 32 is a plan view illustrating a relationship of arrangements of the yoke, the magnet, and the magnetic detecting element of a tenth embodiment.
Figure 33:
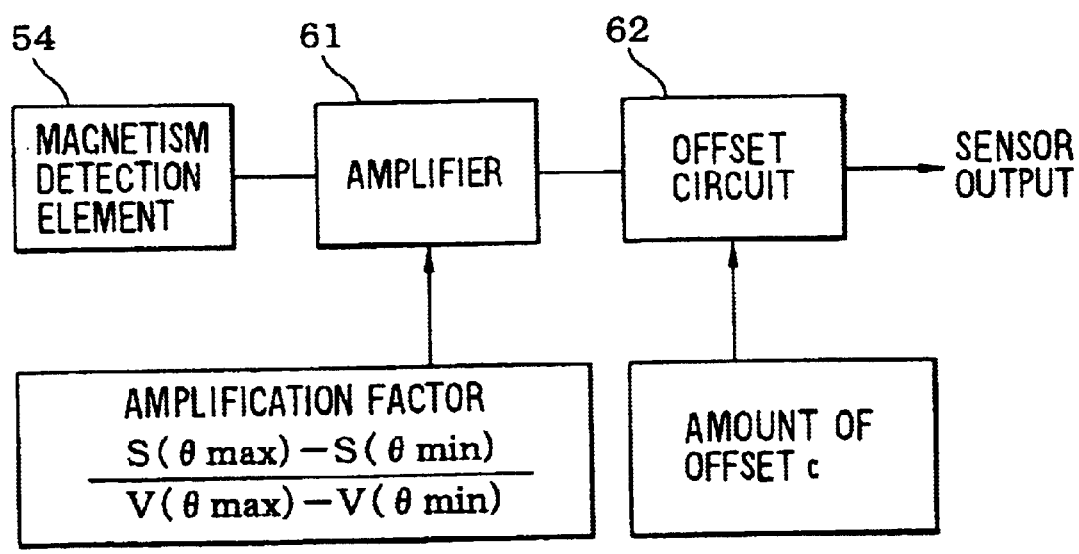
FIG. 33 is a block diagram illustrating a process circuit for the output of the magnetic detecting element of the tenth embodiment.

As shown in FIG. 27, the outputs of the two magnetic detecting elements 54 and 55 are respectively amplified by amplifiers 56 and 57 (see FIG. 29). Amplification factors (gains) of the amplifiers 56 and 57 are set to be equal. Each amount of offsets a and b is respectively added to the output of each amplifier 56 and 57 (amplified output of each magnetic detecting element 54 and 55) by an offset circuit 58 and 59, so that the output is offset to a positive voltage side (FIG. 30). One of the outputs from the offset circuits 58 and 59 (offset outputs from the magnetic detecting element) is selected by an output selector 60 (output selecting means), and is outputted as a final sensor output (FIG. 31). Each of the amount of offsets a and b from each offset circuit 58 and 59 is determined so that the offset outputs from the magnetic detecting elements 54 and 55 is continued on a straight line, when the offset outputs of the magnetic detecting elements 54 and 55 are selected by the output selector 60. An output switching point is a center portion (+45 degree) of the linear regions A and B of the two magnetic detecting elements 54 and 55. Therefore, the offset outputs from the one magnetic detecting element 54 is selected when the angular position is 45 degree or less; whereas the offset outputs from another magnetic detecting element 55 is selected when the angular position is 45 degree or more.

Incidentally, the offset outputs of the magnetic detecting elements 54 and 55 are changed in accordance with the angular position. Therefore, as described in the ninth embodiment, when the detectable angle range becomes broader, the offset outputs of a particular one magnetic detecting element becomes the same at two different angular positions. Therefore, when only offset outputs of the particular one magnetic detecting element are used, the switching point of the offset outputs of the magnetic detecting elements 54 and 55 may be falsely judged.

Therefore, according to the ninth embodiment, the output selector 60 switches the offset outputs of the magnetic detecting elements 54 and 55, by judging the switching point of the offset outputs of the magnetic detecting elements 54 and 55. Here, the output selector 60 performs the judgment by adding up the offset outputs of the magnetic detecting elements 54 and 55, and comparing a sum of the offset outputs with a reference value S3. In this case, the reference value S3 for output switching is set to the maximum value of the offset outputs of the magnetic detecting element 55. Therefore, when the sum of the offset outputs is the reference value S3 or less, the output selector 60 selects the offset outputs from magnetic detecting element 54; whereas when the sum of the offset outputs is more than reference value S3, the output selector 60 selects the offset outputs from magnetic detecting element 55. Here, the reference value 53 is not limited. For example, the sensor outputs at the output switching point (+45 degree) is investigated, and the reference value S3 may be determined to a twice value of the investigated value. The amplification, the offset, and the conversion of the output from the magnetic detecting elements 54 and 55 maybe actualized by using hardware or by software using a microcomputer.

When one of the outputs, which are on the linear regions A and B of the two magnetic detecting elements 54 and 55 each of which is arranged at a different position, are switched, the range of the angular position (detectable angular range) in which the output change characteristic of the angular position detecting apparatus becomes linear (detectable angle range) can be dramatically expanded.

Here, when three or more magnetic detecting elements are arranged at different positions, and when one of the outputs on the liner region is selected, the detectable angle range can be further expanded.

Incidentally, according to the angular position apparatus using the magnetic detecting element, detection accuracy is best at a point where the output of the magnetic detecting element becomes zero. This is because the point where the output of the magnetic detecting element becomes zero is the center of the linear region of the outputs, and therefore the linearity becomes the best. Furthermore, when the output of the magnetic detection is zero, influence to the magnetic detecting element due to a thermal characteristic becomes small. Conventionally, an output error due to a thermal characteristic of the magnetic detecting element is compensated by using a thermal compensation element. However, it is quite difficult to completely eliminate the output error due to the thermal characteristic to zero, because of a variation of the magnetic detecting element or a variation of the thermal compensation element.

Therefore, the detection accuracy becomes the best in the whole detectable angle range at the point where the output of the magnetic detecting element becomes zero.

In view of the above characteristic, according to a tenth embodiment shown in FIGS. 32 to 36, the magnet 52 and the magnetic detecting element 54 are arranged so that the output of the magnetic detecting element 54 becomes zero at a particular angular position (accuracy required point) at which the detection accuracy is extremely required. Furthermore, in order to accord the output of the angular position detecting apparatus (hereinafter, called "sensor") with a required output change characteristic, the output of the magnetic detecting element 54 is amplified in the amplifier 61 (see FIG. 35), outputs of the amplifier 61 is offset by the offset circuit 62 (FIG. 36), and outputs of the offset circuit 62 is outputted as a sensor output. The amplifier circuit 61 and the offset circuit 62 correspond to output adjusting means. Other structures are the same as those of the ninth embodiment.

In this case, the amplification factor of the amplifier 61 is determined by the following equations.

AMPLIFICATION FACTOR=$[S(\theta max) - S(\theta min)]/[V(\theta max) - V(\theta min)]$ Here, $S(\theta)$ is a required output of the sensor when the angular position is $\theta$; $V(\theta)$ is an output of the magnetic detecting element 54 when the angular position is $\theta$; $S(\theta max)$ is a maximum detected angular position; and $S(\theta min)$ is a minimum detected angular position.

Figure 35:
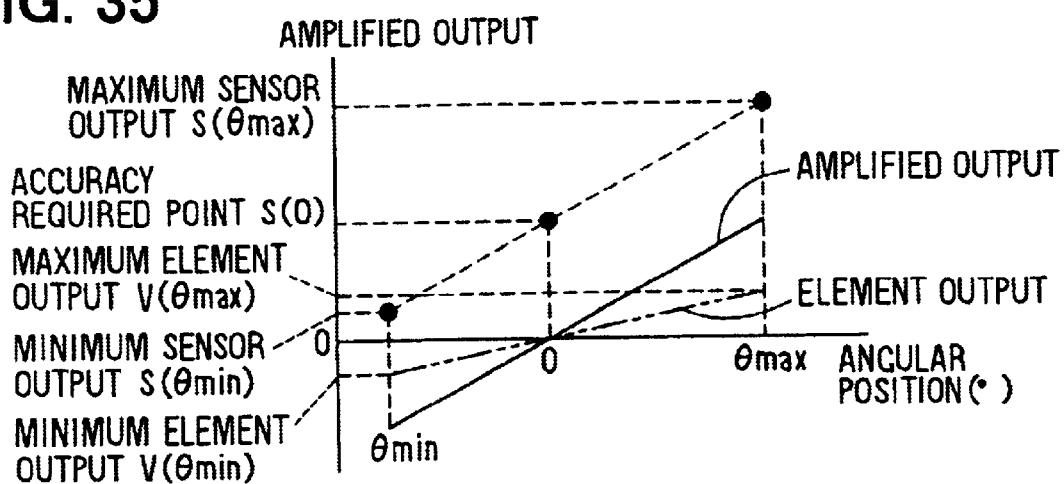
FIG. 35 is an output waveform an amplifier of the tenth embodiment.
Figure 36:
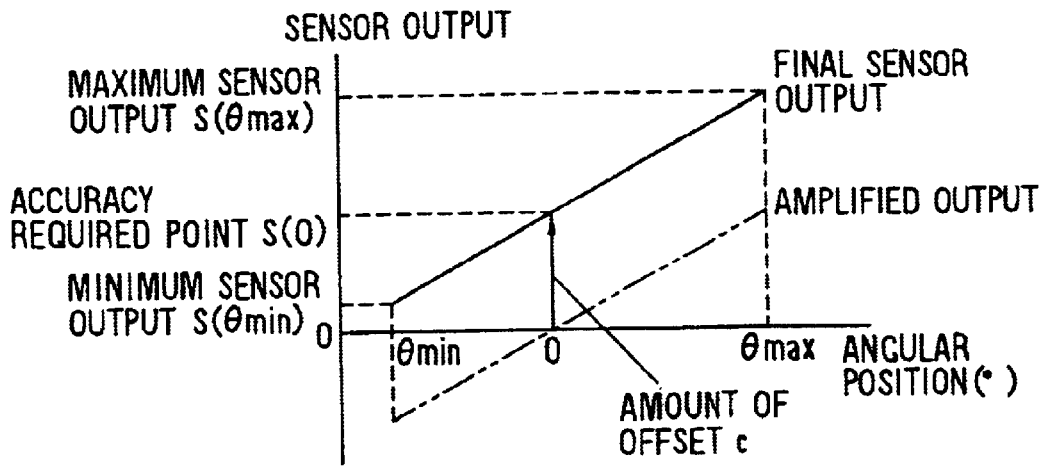
FIG. 36 is a final output waveform of the magnetic detecting apparatus of the tenth embodiment.

Therefore, as shown in FIG. 35, an inclination of the change characteristic of the output of the amplifier 61 (amplified output of the magnetic detecting element 54) becomes the same as an inclination of the required output change characteristic of the sensor.

Furthermore, an amount of offset c of the offset circuit 62 is a difference between the required output of the sensor and the amplified output of the magnetic detecting element 54. The offset circuit 62 matches the amount of offset c to the amplified output of the amplifier to the final sensor output by adding the amount of offset c to the amplified output of the magnetic detecting element 54 to offset it to the positive voltage side. As a result, a final output change characteristic of the sensor can be modified to meet a specification of an external control circuit to be connected to the sensor without changing the specification of the external control circuit.

The structure described in the tenth embodiment can be applied to other kinds of angular position detecting apparatus for several kinds of rotor, such as a throttle openings degree detecting apparatus that detects a throttle opening degree (an angular position of the throttle valve). A detectable range of the throttle openings degree detecting apparatus is approximately 100 degree, from a fully closed to a fully opened. Furthermore, the throttle opening degree during an idle driving is set to around 5 degrees which is a fully closed position, and detection accuracy is extremely required around this throttle opening degree during the idle driving. Therefore, when the structure in the tenth embodiment is applied to the throttle opening degree detecting apparatus, the magnet 52 and the magnetic detecting element 54 are arranged so that the outputs of the magnetic detecting element 54 becomes zero at around the throttle opening degree during the idle driving. As a result, the influence to the thermal characteristic of the magnetic detecting element 54 can be reduced to the minimum at around the throttle opening degree during the idle driving in which the detection accuracy is severely required. Hence, the detection accuracy of the angular position can be improved.

Figure 34:
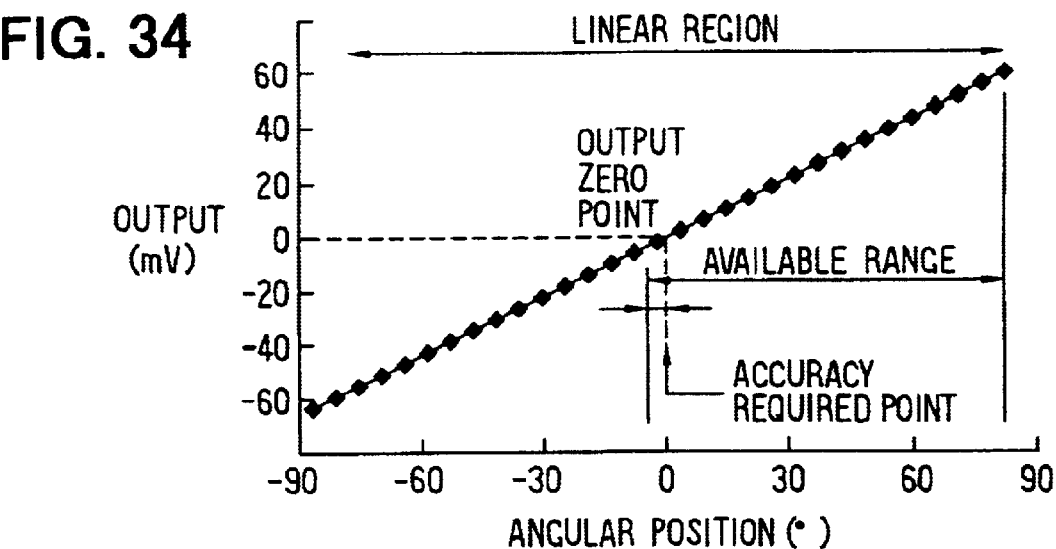
FIG. 34 is an output waveform of the magnetic detecting element of the tenth embodiment.

Here, in the example shown in FIG. 34, the accuracy required point is set to around 5 degrees. However, the accuracy required point can be arbitrarily determined within an available range. In each case, since the accuracy required point is always a zero-output point, a position of the available range is relatively shifted.

Furthermore, in each embodiment, a magnetic shield (shelter) member may be provided to cover the opening of the yoke so as to eliminate an influence due to an external magnetic field to the magnetic detecting element. Here, when the magnetic shield member is arranged too close to the yoke, a magnetic circuit is formed between the magnetic shield member and the yoke, and therefore the distribution of the magnetic field inside the yoke is changed. Therefore, it is preferable to set a gap between the magnetic shield member and the yoke so that no magnetic circuit is formed.

The present invention is not limited to the throttle opening degree detecting apparatus, but is applicable to several kinds of angular position detecting apparatus.

What is claimed is:

1. An angular position detecting apparatus comprising:
   a non-rotation portion;
   a rotor rotatably supported by the non-rotation portion for being rotated in response to a rotation of a target detection object;
   a magnet magnetized in one direction, and provided at one member of a set consisting of the non-rotation portion and the rotor;
   a yoke provided at a same member of the set consisting of the non-rotation portion and the rotor, as the magnet, the yoke being provided for generating a magnetic field between the yoke and the magnet; and
   a magnetic detecting element being provided in the magnetic field and at a different member of the set consisting of the non-rotation portion and the rotor, the magnetic detecting element being offset from a rotation axis of the rotor, the magnetic detecting element outputting output signals in response to the rotation of the rotor, an amount of the offset of the magnetic detecting element from the rotation axis of the rotor being determined so that an angle $\theta s$ of magnetic flux to be detected by the magnetic detecting element is smaller than an angular position $\theta m$ of the rotor,
   wherein, the magnet applies a magnetic field having intensity so that output signals of the magnetic detecting element are saturated, and
   the magnetic detecting element is made up of a ferromagnetic thin film magnetic resistance element, and outputs the output signals in response to the angle of the magnetic flux crossing the ferromagnetic thin film magnetic resistance element.

2. An angular position detecting apparatus according to claim 1, wherein:
   the yoke has a shape of any one of a cylinder, an ellipse, a part of a cylinder, and a part of an ellipse; and
   the magnet is arranged so that one pole thereof is positioned toward the rotation axis of the yoke.

3. An angular position detecting apparatus according to claim 1, wherein the magnet is arranged so that another pole thereof contacts with the yoke.

4. An angular position detecting apparatus according to claim 1, wherein a radius of curvature of the yoke is determined so that an angle $\theta s$ of magnetic flux to be detected by the magnetic detecting element is smaller than an angular position $\theta m$ of the rotor.

5. An angular position detecting apparatus according to claim 1, wherein the amount of offset of the magnetic detecting element from the rotation axis of the rotor is determined so that an output change characteristic of the magnetic detecting element with respect to an angular position $\theta m$ of the rotor becomes linear.

6. An angular position detecting apparatus according to claim 1, wherein a radius of curvature of the yoke is determined so that an output change characteristic of the magnetic detecting element with respect to an angular position $\theta m$ of the rotor becomes linear.

7. An angular position detecting apparatus according to claim 1, wherein an amount of offset of the magnetic detecting element from the rotation axis of the rotor is determined so that an output change characteristic of the magnetic detecting element with respect to an angular position $\theta m$ of the rotor becomes a curve having an upper convex.

8. An angular position detecting apparatus according to claim 1, wherein a radius of curvature of the yoke is determined so that an output change characteristic of the magnetic detecting element with respect to an angular position $\theta m$ of the rotor becomes a curve having an upper convex.

9. An angular position detecting apparatus according to claim 1, wherein an amount of offset of the magnetic detecting element from the rotation axis of the rotor is determined so that an output change characteristic of the magnetic detecting element with respect to an angular position $\theta m$ of the rotor becomes a curve having a lower convex.

10. An angular position detecting apparatus according to claim 1 wherein a radius of curvature of the yoke is determined so that an output change characteristic of the magnetic detecting element with respect to an angular position $\theta m$ of the rotor becomes a curve having a lower convex.

11. An angular position detecting apparatus according to claim 1, wherein plural magnetic detecting elements are arranged on a common circumference whose center corresponds to the rotation axis of the rotor.

12. An angular position detecting apparatus comprising:

plural magnetic detecting elements for outputting an output signal in response to a rotation of a target detection object, each of the magnetic detecting elements having a range of an angular position in which an output characteristic becomes linear, the range being different from each other with respect to every magnetic detecting element;

an output selector for selectively outputting outputs of a particular magnetic detecting element in a linear region, depending on the angular position; and an output adjustor for adjusting at least one of an amount of offset and an amplification factor regarding the outputs of the magnetic detecting elements, so that the outputs of the magnetic detecting elements are connected as a straight line.

13. An angular position detecting apparatus according to claim 12, wherein:

the output selector adds up the outputs of the magnetic detecting elements, and determines an output switching point at which the outputs of the magnetic detecting elements are switched based on a sum of the outputs of the magnetic detecting elements.

14. An angular position detecting apparatus comprising:

plural magnetic detecting elements for outputting an output signal in response to a rotation of a target detection object, each of the magnetic detecting elements having a range of an angular position in which an output characteristic becomes linear, the range being different from each other with respect to every magnetic detecting element;

an output selector for selectively outputting outputs of a particular magnetic detecting element in a linear region, depending on the angular position;

a non-rotation portion;

a rotor rotatably supported by the non-rotation portion for being rotated in response to a rotation of the target detection object;

a magnet magnetized in one direction, and provided at one member of set consisting of the non-rotation portion and the rotor; and a yoke for generating magnetic field between the yoke and the magnet, wherein the magnetic detecting element are provided in the magnetic field and provided at a different member of the set consisting of the non-rotation portion and the rotor, the magnetic detecting elements offset from a rotation axis of the rotor, and the magnetic detecting element for outputting an output signal in response to the rotation of the rotor.

15. An angular position detecting apparatus comprising:

a magnetic detecting element for outputting an output signal in response to a rotation of one of a magnet and the magnetic detecting element as a result of rotation of a target detection object, wherein the magnet and the magnetic detecting element are arranged so that outputs of the magnetic detecting element becomes substantially zero at around a particular angular position at which detection accuracy is extremely required; and an output adjustor for amplifying the outputs of the magnetic detecting elements, for offsetting the amplified outputs, so that an output change characteristic of the angular position detecting apparatus accords with a required output change characteristic.

16. An angular position detecting apparatus comprising:

a magnetic detecting element for outputting an output signal in response to a rotation of one of a magnet and the magnetic detecting element as a result of rotation of a target detection object, wherein the magnet and the magnetic detecting element are arranged so that outputs of the magnetic detecting element becomes substantially zero at around a particular angular position at which detection accuracy is extremely required;

a non-rotation portion;

a rotor rotatably supported by the non-rotation portion for being rotated in response to a rotation of the target detection object;

a magnet magnetized in one direction, and provided at one member of a set consisting of the non-rotation portion and the rotor; and a yoke for generating magnetic field between the yoke and the magnet, wherein the magnetic detecting element is provided in the magnetic field and provided at a different member of the set consisting of the non-rotation portion and the rotor, the magnetic detecting element offset from a rotation axis of the rotor, and the magnetic detecting element for outputting an output signal in response to the rotation of the rotor.

17. An angular position detecting apparatus according to claim 1, wherein the target detection object is a throttle valve, and a throttle valve opening degree is detected based on the outputs of the magnetic detecting element.

* * * * *